US012576776B2

(12) United States Patent
Nagaraja et al.

(10) Patent No.: US 12,576,776 B2
(45) Date of Patent: Mar. 17, 2026

(54) SCENE ILLUMINATION DETECTION FOR AUTONOMOUS SYSTEMS AND APPLICATIONS

(71) Applicant: NVIDIA Corporation, Santa Clara, CA (US)

(72) Inventors: Keerthi Raj Nagaraja, Santa Clara, CA (US); Arjun Gupta, Stanford, CA (US); Abhishek Bajpayee, Santa Clara, CA (US); Kivanc Temel, Cambridge, MA (US); Dylan Doblar, San Jose, CA (US); Sai Krishnan Chandrasekar, Santa Clara, CA (US); Yu Wang, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/929,469

(22) Filed: Oct. 28, 2024

(65) Prior Publication Data

US 2025/0058700 A1    Feb. 20, 2025

Related U.S. Application Data

(63) Continuation of application No. 18/450,989, filed on Aug. 16, 2023, now Pat. No. 12,187,187.

(51) Int. Cl.
| | |
|---|---|
| *B60Q 1/14* | (2006.01) |
| *G06V 10/60* | (2022.01) |
| *G06V 10/82* | (2022.01) |
| *G06V 20/56* | (2022.01) |

(52) U.S. Cl.
CPC ............. *B60Q 1/143* (2013.01); *G06V 10/60* (2022.01); *G06V 10/82* (2022.01); *G06V 20/56* (2022.01)

(58) Field of Classification Search
CPC ........ B60Q 1/143; B60Q 1/1423; B60Q 1/02; B60Q 1/04; B60Q 1/14; G06V 10/60; G06V 10/82; G06V 20/56; H05B 47/105; G06N 5/04; F21V 23/0442; F21V 23/0464
See application file for complete search history.

(56) References Cited

U.S. PATENT DOCUMENTS

| | | | |
|---|---|---|---|
| 11,897,471 B2 * | 2/2024 | Sajjadi Mohammadabadi ........... G06V 10/82 | |
| 12,187,187 B1 * | 1/2025 | Nagaraja ................ G06V 10/82 | |
| 2015/0168555 A1 | 6/2015 | Herschbach | |
| 2017/0138572 A1 * | 5/2017 | Biron ....................... F21S 11/00 | |
| 2021/0229594 A1 | 7/2021 | Roychowdhury | |
| 2023/0219488 A1 * | 7/2023 | Hsu .......................... B60Q 1/12 | |

* cited by examiner

*Primary Examiner* — Bao Q Truong
(74) *Attorney, Agent, or Firm* — Sanders IP Law

(57) ABSTRACT

The present disclosure relates to determining a first illumination level corresponding to an area based at least on a first illumination detection obtained using a first illumination detector corresponding to a machine. A second illumination level corresponding to the area may be determined based at least on a second illumination detection obtained using a second illumination detector corresponding to the machine. Based at least on the first illumination level and the second illumination level, a scene illumination state of the area may be determined. Based at least on the scene illumination state, one or more lights of the machine may be controlled.

20 Claims, 11 Drawing Sheets

SCENE ILLUMINATION DETECTION FOR AUTONOMOUS SYSTEMS AND APPLICATIONS

CROSS-REFERENCE TO RELATED APPLICATION

This application is a continuation of U.S. patent application Ser. No. 18/450,989, filed on Aug. 16, 2023, the disclosure of which is incorporated herein by reference in its entirety.

BACKGROUND

Illumination of a scene may correspond to different states depending on the amount and/or type of light that is illuminating the scene. For example, a "bright natural" illumination state may correspond to a bright day at which there is a lot of natural light illuminating the scene. A "low natural" illumination state may correspond to dark days, dawn, or dusk in which the scene is illuminated by natural light, but in a muted or low level. An "artificial" illumination state may correspond to illumination by artificial light in an otherwise dark area (e.g., at night, in a tunnel, etc.). A "dark" illumination state may correspond to a dark area including little to no illumination by any source. The different illumination states may affect visibility for the operation of a machine. For example, depending on the amount of illumination, a machine may enable or disable illumination beams (e.g., headlights). Further, depending on different illumination states, different levels of illumination beams may be employed. For example, for dark areas a high illumination beam may be enabled.

In addition, in some instances, a machine may travel through different areas that correspond to different illumination states. For example, a vehicle may travel through a dark area and then an artificially illuminated area then back to a dark area. In some instances, such transitions may occur fairly rapidly and/or fairly periodically. For example, a vehicle may be travelling in an artificially illuminated area then may temporarily transition to a dark area and then transition back to an artificially illuminated area.

Such transitions may make it difficult for systems to make decisions regarding when to switch between different types of illumination beams. Additionally or alternatively, such transitions may cause some traditional systems to rapidly transition between different levels of illumination beams, which may be distracting to operators of the machines cycling through different illumination settings and/or other machine operators, other machines, pedestrians, etc., that may be in the vicinity or light field of the machines.

SUMMARY

According to one or more embodiments of the present disclosure, one or more (e.g., multiple) illumination sensors may be used to determine a scene illumination state of an area at which a machine may be located and/or travelling. For example, in some embodiments a first illumination sensor may be configured to obtain a first sensor data corresponding to a near-field range around and/or in a direction of travel of the machine. Additionally or alternatively, a second illumination sensor may be configured to obtain a second sensor data corresponding to a far-field range around and/or in the direction of travel of the machine. In these or other embodiments, the first sensor data and the second sensor data may be used to determine a scene illumination state of the area at which the machine is located and/or at an area ahead of the machine in the direction of travel of the machine.

One or more embodiments of the present disclosure may help in more accurately determining illumination states for areas not only at which a machine may be currently located, but for areas at which the machine may be located in a relatively short amount of time. Additionally or alternatively, one or more embodiments of the present disclosure may better help in determining whether transitions between illumination states are relatively short, which may allow for better decision making regarding deciding between and/or changing states of illumination that may be applied by the machine.

BRIEF DESCRIPTION OF THE DRAWINGS

The present systems and methods for determining illumination states for autonomous and semi-autonomous systems and applications are described in detail below with reference to the attached figures, wherein.

DETAILED DESCRIPTION

Figure 1A:
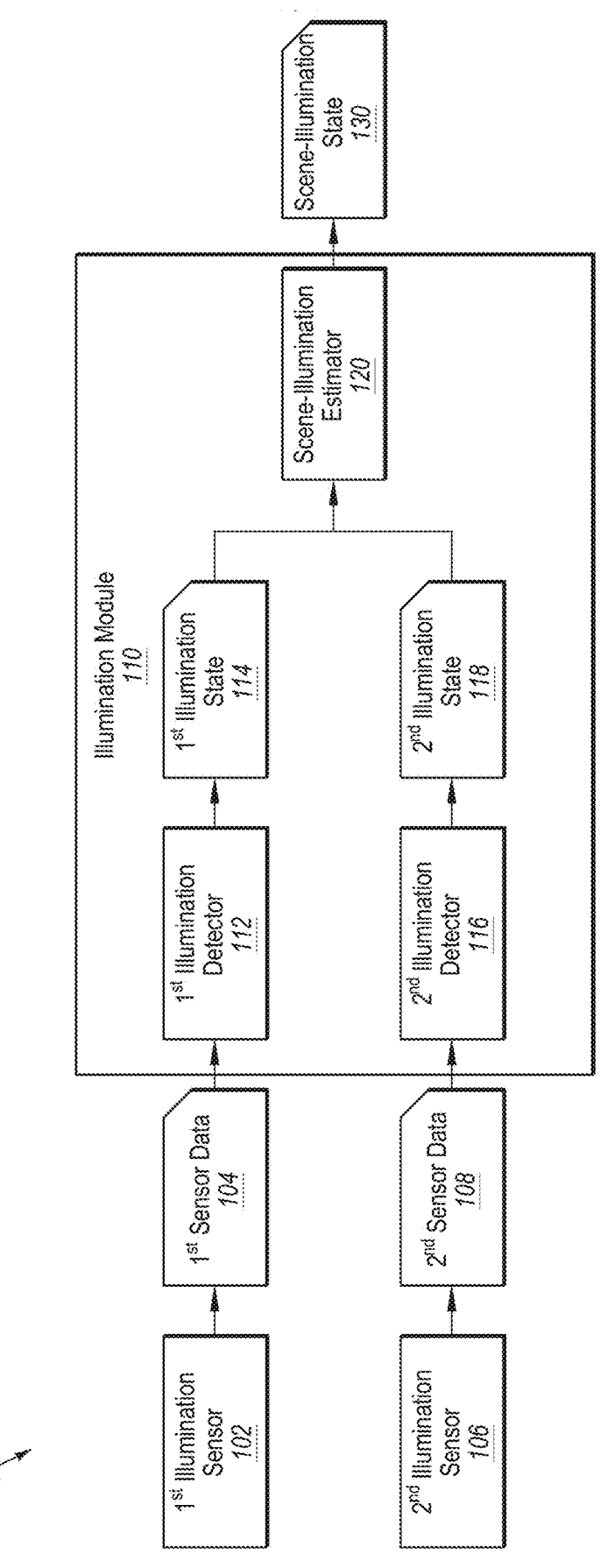
FIGS. 1A-1E illustrate an example system configured to determine an illumination state of a scene, in accordance with one or more embodiments of the present disclosure.

Systems and methods are described related to detecting illumination states of areas corresponding to a location of a machine. For example, one or more embodiments may relate to detecting different levels of illumination of different regions and determining illumination states of the regions based on the levels of illumination. For instance, an illumination detection system ("detection system") may detect the illumination level of a region corresponding to the location of the machine using one or more illumination detectors. In these and other embodiments, the detection system may determine an illumination state of the region. Additionally or alternatively, the illumination detection system may identify changes in the illumination state as a vehicle or other machine type travels through different regions.

One or more of the embodiments disclosed herein may relate to detecting illumination states that may be associated with one or more ego-machines, which may include any applicable machine or system that is capable of performing one or more autonomous or semi-autonomous operations. Example ego-machines may include, but are not limited to, vehicles (land, sea, space, and/or air), robots, robotic platforms, etc. By way of example, the ego-machine computing applications may include one or more applications that may be executed by an autonomous vehicle or semi-autonomous vehicle, such as an example autonomous vehicle 400 (alternatively referred to herein as "vehicle 400" or "ego-machine 400") described with respect to FIGS. 4A-4D. In the present disclosure, reference to an "autonomous vehicle" or "semi-autonomous vehicle" may include any vehicle that may be configured to perform one or more autonomous or semi-autonomous navigation or driving operations. As such, such vehicles may also include vehicles in which an operator is required or in which an operator may perform such operations as well.

The systems and methods described herein may be used by, without limitation, non-autonomous vehicles or machines, semi-autonomous vehicles or machines (e.g., in one or more adaptive driver assistance systems (ADAS)), autonomous vehicles or machines piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI (such as by employing one or more language models such as one or more large language models (LLMs)), light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations (e.g., systems that implement one or more language models, such as large language models (LLMs)), systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

The embodiments of the present disclosure may help improve accuracy of detecting illumination states and determining a scene-illumination state of a region at which a machine may be located or traveling. For example, in one or more embodiments of the present disclosure, the detection system may include one or more illumination sensors that may improve the accuracy of the detection system. For instance, the detection system may include a first illumination sensor ("first sensor") and a second illumination sensor ("second sensor"). For example, the detection system may include a wide-view camera and/or a telescopic camera. In some embodiments, the detection system may make a determination of the illumination state based on a first sensor data detected using the first sensor. For example, in some embodiments, the first illumination state may provide enough confidence for the detection system to make the determination of the scene-illumination state. Contrastingly, in some instances, the first illumination state may not provide enough confidence for the detection system to make the determination due to upcoming change in the illumination state or slight illumination in the region. For example, the machine may be traveling away or toward a light source, and the region may not be sufficiently illuminated nor dark. In these and other instances, the detection system may use a second sensor data detected by the second sensor. For example, the second sensor data may provide illumination information of a region further ahead of the machine. For instance, a second illumination state may indicate that the machine is traveling toward an illuminated region or a dark region. For example, the second sensor may indicate to the detection system that a light source is present in the region ahead of the machine. In these instances, the detection system may determine the scene-illumination state as illuminated based on the first illumination state and the second illumination state.

The embodiments of the present disclosure may help improve accuracy over some traditional approaches to scene-illumination determination. For example, some traditional approaches to illumination determination may include usage of maps. The maps may include information about locations of light sources in a particular region. In some instances, such information may be used to determine whether a particular area is illuminated. For example, when a light source is indicated as being present at a particular location, an area around the particular location may be assumed to be illuminated. However, such a technique may be limited depending on the accuracy of the map and/or whether the light sources are actually providing light at a particular instance in time. Further, such techniques may be such that the maps need to be updated regularly and requires a large coverage area.

Further, other techniques may include usage of photoelectric sensors gauging ambient light. For example, a photoelectric sensor may be located on a machine to detect ambient light in the area at which the machine is traveling. For instance, the scene-illumination state of the area may be determined based on the amount of light the photoelectric sensor detects. However, the use of a single photoelectric sensor may be limited due to its range. For example, the photoelectric sensor may be able to determine the illumination state of a region close to the machine based on amount of ambient light. However, the photoelectric sensor may not as effectively determine the illumination state as the machine travels through regions with different illumination states. For example, the machine may be in a region that may be in between being illuminated and being dark. For instance, the machine may be traveling away from a light source such as a lamp post. The photoelectric sensor may still detect some ambient light from the lamp post and accordingly the illumination detected by the photoelectric sensor on its own may not provide sufficient information regarding whether the machine is approaching a dark region until the machine actually reaches the dark region.

The embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

With respect to FIGS. 1A-1E, FIGS. 1A-1E illustrate an example system 100 configured to determine an illumination state of a scene or an area, in accordance with some embodiments of the present disclosure. In some embodiments, the system 100 may be implemented on a machine (e.g., the vehicle 400 of FIGS. 4A-4D). Additionally or alternatively, the machine may be traveling or located in the area such that the system 100 may be used by the machine to determine the illumination state corresponding to the area at which the machine may be located or traveling.

As detailed herein, in general, the system 100 may include a first illumination sensor ("first sensor") 102 and a second illumination sensor ("second sensor") 106. Although described as using two sensors, this is not intended to be limiting, and any number of sensors (e.g., 1, 2, 3, 4, 5, etc.) may be used without departing from the scope of the present disclosure. The first sensor 102 may be used to obtain a first sensor data ("first data") 104 corresponding to the area, and the second sensor 106 may be used to obtain a second sensor data ("second data") 108 corresponding to the area. Although described as having two sensor data, this is not intended to be limiting, and any number of sensor data (e.g., 1, 2, 3, 4, 5, etc.) may be used without departing from the scope of the present disclosure.

The system 100 may additionally include an illumination module 110 that may be configured to obtain the first data 104 and the second data 108. As discussed in further detail herein, the illumination module 110 may be configured to determine a scene-illumination state 130 based on one or more of the first data 104 or the second data 108. In some embodiments, the illumination module 110 may include a first illumination detector ("first detector") 112, a second illumination detector ("second detector") 116, and a scene-illumination estimator 120. The first detector 112 may obtain the first data 104 and may determine a first illumination state 114 corresponding to the area and based on the first data 104. The second detector 116 may obtain the second data 108 and may determine a second illumination state 118 corresponding to the area and based on the second data 108. In these or other embodiments, the scene-illumination estimator 120 may obtain the first illumination state 114 and/or the second illumination state 118 and determine the scene-illumination state 130 based on the first illumination state 114 and/or the second illumination state 118.

In some embodiments, one or more of the modules described herein may be implemented using hardware including one or more processors, central processing units (CPUs) graphics processing units (GPUs), data processing units (DPUs), parallel processing units (PPUs), micropro- cessors (e.g., to perform or control performance of one or more operations), field-programmable gate arrays (FPGA), application-specific integrated circuits (ASICs), accelerators (e.g., deep learning accelerators (DLAs)), programmable vision accelerators (including one or more direct memory address (DMA) systems and/or vector processing units (VPUs)), and/or other processor types. In some other instances, one or more of these modules may be imple- mented using a combination of hardware and software. In the present disclosure, operations described as being per- formed by a respective module may include operations that the respective module may direct a corresponding comput- ing system to perform. In these or other embodiments, one or more of these modules may be implemented by one or more computing devices, such as that described in further detail with respect to FIGS. 4A-4D, 5, and/or 6.

The first sensor 102 may include any suitable system, apparatus, or device that may be used to obtain the first data 104. The first data 104 may include any type of data representative of an amount of light in an area corresponding to the first sensor 102.

For example, in some embodiments, the first sensor 102 may include a camera configured to capture images that may be stored as image data. In these or other embodiments, the first data 104 may accordingly include an image of the area captured by the first sensor 102 and the image data corre- sponding thereto. For instance, the image (and/or corre- sponding image data) may indicate a certain level of light exposure associated with the image and corresponding to an amount of light present in the area at the time of capture of the image. In the present disclosure reference to an "image" may also refer to the image data corresponding thereto.

In other embodiments, the first sensor 102 may include a variable resistor configured to detect ambient light in the area. In these or other embodiments, resistance between two terminals of the variable resistor may decrease as the vari- able resistor detects more light in the area. Accordingly, the first data 104 may include the resistance measured by the first sensor 102. For instance, the resistance may indicate a certain level of the ambient light associated with the area.

In some embodiments, the first sensor 102 may be con- figured to obtain the first data 104 with respect to the area in a relatively close proximity of the machine. For example, in some embodiments, the first sensor 102 may include a wide-view camera. Additionally or alternatively, as indi- cated herein, the first sensor 102 may include a photoelectric sensor. In some embodiments, the first data 104 may include a raw signal obtained using the first sensor 102.

The second sensor 106 may include any suitable system, apparatus, or device that may be used to obtain the second data 108. The second data 108 may include any type of data representative of an amount of light in an area corresponding to the second sensor 106. In some embodiments, the second data 108 may include same type of data as the first data 104. In other embodiments, the second data 108 may include a type of data that is different from the first data 104.

For example, in some embodiments, the second sensor 106 may include a camera configured to capture images that may be stored as image data. In these and other embodi- ments, the second data 108 may accordingly include an image of the area captured by the second sensor 106. For instance, the image may indicate a certain level of light exposure associated with the image and corresponding to an amount of light present in the area at the tie of capture of the image.

In some embodiments, the second sensor 106 may be configured to obtain the second data 108 with respect to the area relatively further away from the machine. For example, in some embodiments, the second sensor 106 may include a telescopic camera.

The first detector 112 may be configured to obtain the first data 104 from the first sensor 102. In these or other embodiments, the first detector 112 may be configured to determine the first illumination state 114 based on the first data 104. For example, in some embodiments, the first sensor 102 may be a wide-view camera and the first data 104 may be an image generated by the first sensor 102. In some embodiments, the first illumination state 114 may include a first illumination level. For example, the illumination level may be a numerical representation of the first illumination state 114. For instance, the first illumination level may represent an amount of light in the area corresponding to the first sensor 102. In these and other embodiments, the first illumination level that is included in the first illumination state 114 may include a value along a sliding illumination scale that may be represented by a digital or analog representation.

In these and other embodiments, the first detector 112 may be configured to determine an amount of light exposure present in the first data 104. For example, in some embodiments, the first detector 112 may be configured to determine the amount of light exposure in the first data 104 by converting the image into a certain color format (e.g., RGB, YUV, etc.) and calculating a luminance of the image based on the color format.

For example, the image may be converted into a RGB color format, and the luminance may be calculated based on color values of red, green, and blue in the image. In these embodiments, the luminance may be represented as a value within a typical luminance range for the RGB color format (e.g., 0 to 255). For example, least luminance (e.g., black) may be represented as 0 and most luminance (e.g., white) may be represented as 255. In some embodiments, the luminance may be analyzed to determine a probability of the area depicted in the image being illuminated. For example, higher luminance may indicate higher probability of the area being illuminated while lower luminance may indicate lower probability of the area being illuminated. In these embodiments, the typical luminance range for the RGB color format may be converted to a first illumination scale (e.g., 0 to 1). In these or other instances, 0 may indicate that the area is dark with full certainty and 1 may indicate that the area is illuminated with full certainty. In these embodiments, the probability, generated from the luminance, may be higher (e.g., closer to 1) when the area is more likely to be illuminated than dark.

The first detector 112 may include any suitable system, apparatus, or device that may be used to determine the first illumination state 114. For example, in some embodiments, the first detector 112 may be configured to communicate with a machine learning model configured to determine the first illumination state 114. In other embodiments, the first detector 112 may include the machine learning model. In the present disclosure, reference to a "machine learning model" may include reference to any suitable algorithms, computer systems, neural networks, deep learning models, and/or other models that may be configured to analyze one or more characteristics corresponding to input data. By way of example and not limitation, the machine learning model may include: a supervised model, an unsupervised model, and/or a semi-supervised model.

In some embodiments, the first illumination state 114 may include a first discrete illumination state. For example, the first discrete illumination state may include a representation of the first illumination state 114 as a specific state (e.g., illuminated, dark, transitory). In these and other embodiments, the first discrete illumination state may be determined based at least on the first illumination level. For example, the first detector 112 may be configured to determine the first discrete illumination state based at least on a set of threshold ranges corresponding to the first illumination level. For instance, the first illumination level may be a number on the first illumination scale covering a certain range of values (e.g., 0 to 1) indicative of amount of illumination present in the area.

Figure 1B:
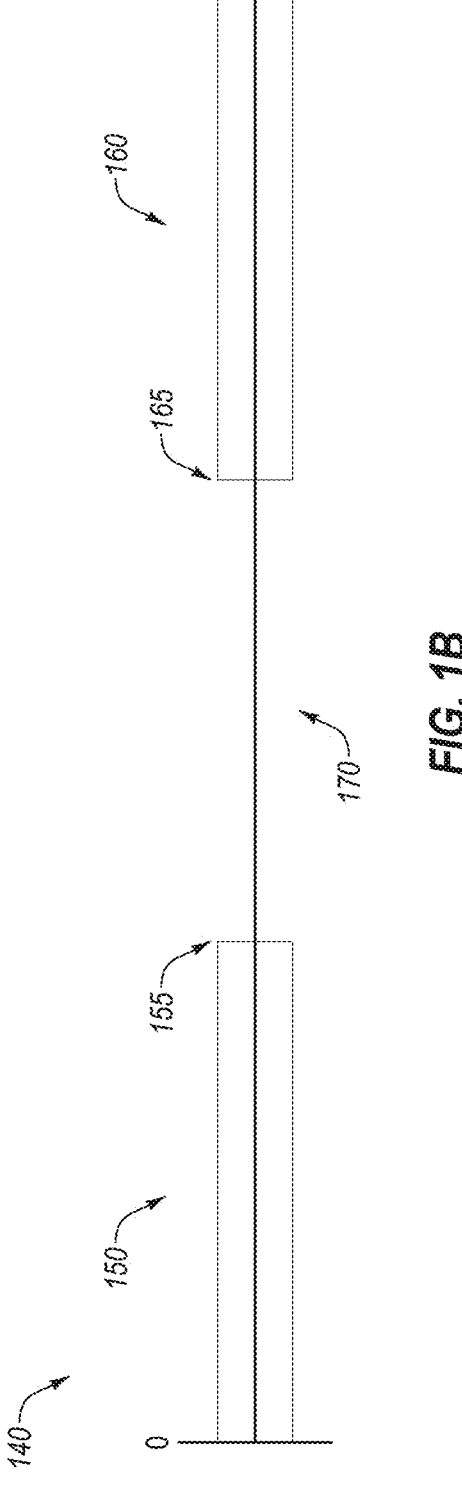

FIG. 1B illustrates an example first illumination scale 140, according to one or more embodiments of the present disclosure. The first illumination scale 140 may include a set of threshold ranges. In some embodiments, the set of threshold ranges may include at least a first threshold range 150 and a second threshold range 160. For example, in instances in which the first illumination scale 140 ranges from 0 to 1, the first threshold range 150 may be a range from 0 to a first point 155 on the first illumination scale 140 and the second threshold range 160 may be a range from a second point 165 on the first illumination scale 140 to 1. In some embodiments, the second point 165 may be greater than the first point 155. The first illumination level, determined as a number between 0 and 1 may be placed on the first illumination scale 140.

Returning to FIG. 1A described with respect to the first illuminations scale 140 of FIG. 1B, in some embodiments, the first detector 112 may determine the first discrete illumination state as the dark state in response to the first illumination level satisfying the first threshold range 150. For example, in some embodiments, the first threshold range 150 may be satisfied by the first illumination level falling within the first threshold range 150 on the first illumination scale 140. Additionally or alternatively, the first detector 112 may determine the first discrete illumination state as the illuminated state in response to the first illumination level satisfying the second threshold range 160. For example, in some embodiments, the second threshold range 160 may be satisfied by the first illumination level falling within the second threshold range 160 on the first illumination scale 140.

In some embodiments, the first illumination scale 140 may include a transitory range 170. The transitory range 170 may be a range between the first threshold range 150 and the second threshold range 160 on the first illumination scale 140. For example, the transitory range 170 may be between the first point 155 and the second point 165, such as illustrated in FIG. 1B. In these instances, the first detector 112 may make a determination as being in the transitory state.

In some embodiments, the transitory state may indicate that the area corresponding to the first sensor 102 may not be determinatively dark or illuminated. For instance, the machine may be traveling toward or away from a light source and the area may be slightly illuminated that it is not dark enough or illuminated enough for the first detector 112 to determine the area as dark or illuminated. In these and other embodiments, the first detector 112 may retrieve a previous illumination state. For example, the previous illumination state may be the illuminated state indicating that the machine may be traveling from an illuminated region toward a dark region. In these embodiments, a transitory position may be determined to reflect how close the determination is from being determinatively in the dark state. For example, the transitory position may be determined according to how far the first illumination level is from the first threshold range 150 within the first illumination scale 140.

For example, the transitory position may be represented as a number between a range (e.g., 0 to 1). In these instances, 0 may indicate that the illumination level is closest possible to the first threshold range 150, and 1 may indicate that the first illumination level is farthest possible from the first threshold range 150 and closest possible to the second threshold range 160 accordingly.

In some embodiments, the previous illumination state may be retrieved as the dark state indicating that the machine may be traveling from a dark region to an illuminated region. In these embodiments, the transitory position may be determined according to how far the first illumination level is from the second threshold range 160 in a similar manner as how the transitory position may be determined in instances with the previous illumination state as the illuminated state.

In some embodiments, the scene-illumination estimator 120 may obtain the first discrete illumination state. In response to the first discrete illumination state being the dark state or the illuminated state, the scene-illumination estimator 120 may be configured to obtain confirmation from the second detector.

In these and other embodiments, the second detector 116 may be configured to obtain the second data 108 from the second sensor 106 and determine the second illumination state 118. In some embodiments, the second illumination state 118 may include a second illumination level indication. The second illumination level indication may include a value along a sliding illumination scale that may be represented by a digital or analog representation in some embodiments.

For example, the second detector 116 may be configured to quantify the second data 108 into an illumination level. For instance, the second illumination level may include a probability related to an amount of illumination. For example, in some embodiments, the second sensor 106 may be or include a telescopic camera configured to capture an image of an area further away from the machine that the area corresponding to the first sensor 102. Accordingly, the second data 108 may be the image of the area obtained by the second sensor 106. The second detector 116 may be configured to determine an amount of exposure present in the second data 108. For example, in some embodiments, the second detector 116 may be configured to determine the amount of exposure in the second data 108 by converting the image into a certain color format (e.g., RGB, YUV, etc.) and calculating a luminance of the image based on the color format.

For example, the image may be converted into a RGB color format, and the luminance may be determined based on color values for red, green, and blue in the image. In these embodiments, the luminance may be represented as a value within a typical luminance range for the RGB color format (e.g., 0 to 255). For example, least luminance (e.g., black) may be represented as 0 and most luminance (e.g., white) may be represented as 255. In some embodiments, the luminance may be converted to represent a probability of the area depicted in the image being illuminated. For example, higher luminance may indicate higher probability of the area being illuminated while lower luminance may indicate lower probability of the area being illuminated. In these embodiments, the typical luminance range for the RGB color format may be converted to a second illumination scale (e.g., 0 to 1). In these instances, 0 may indicate that the area is dark with full certainty and 1 may indicate that the area is illuminated with full certainty. In these embodiments, the probability, generated from the luminance, may be higher (e.g., closer to 1) when the area is more likely to be illuminated than dark. In other embodiments, the second illumination scale may cover any suitable range of values. For example, the second illumination scale may cover a wider range (e.g., 0-255), or a narrower range (e.g., 0-0.5). In some embodiments, the second illumination scale may encompass a different range of values than the first illumination scale. In other embodiments, the second illumination scale may encompass similar or same range of values as the first illumination scale.

The second detector 116 may include any suitable system, apparatus, or device that may be used to determine the second illumination state 118. For example, in some embodiments, the second detector 116 may be configured to communicate with a machine learning model configured to determine the second illumination state 118. In other embodiments, the second detector 116 may include the machine learning model.

In these and other embodiments, the scene-illumination estimator 120 may be configured to apply a confirmatory illumination scale to the second illumination state 118 to confirm the first illumination state 114. For instance, in response to the first illumination state 114 being dark, the confirmatory illumination scale may be applied to the second illumination state (e.g., the second illumination level) 118 to confirm the first illumination state 114. For example, the confirmatory illumination scale may include a range of numbers (e.g., 0 to 1) that may correspond to the second illumination state 118. In some instances, the confirmatory illumination scale may further include a confirmatory dark threshold. In response to the second illumination state 118 falling within the confirmatory dark threshold (e.g., falling between 0 and the confirmatory dark threshold), the scene-illumination estimator 120 may confirm the first illumination state 114 and determine the scene-illumination state 130 as the dark state. In some instances, the first illumination state 114 may be determined as the illuminated state. In these instances, the confirmatory illumination scale may include a confirmatory illuminated threshold. In response to the second illumination state 118 falling within the confirmatory illuminated threshold (e.g., falling between the confirmatory illuminated threshold and 1), the scene-illumination estimator 120 may confirm the first illumination state 114 and determine the scene-illumination state 130 as the illuminated state.

In some embodiments, the first illumination state 114 may be determined as the transitory state. In these and other embodiments, in response to the first illumination state 114 being determined as the transitory state, the scene-illumination estimator 120 may be configured to determine the scene-illumination state 130 based on the first illumination level, the second illumination state 118, and the previous illumination state. For example, in response to the first illumination state 114 being the transitory state and the previous illumination state being determined as the illuminated state, the scene-illumination estimator 120 may seek to obtain additional confidence from the second illumination state 118 to make a determination that the machine is actually traveling toward a dark region from an illuminated region.

Figures 1C, 1D, 1E:
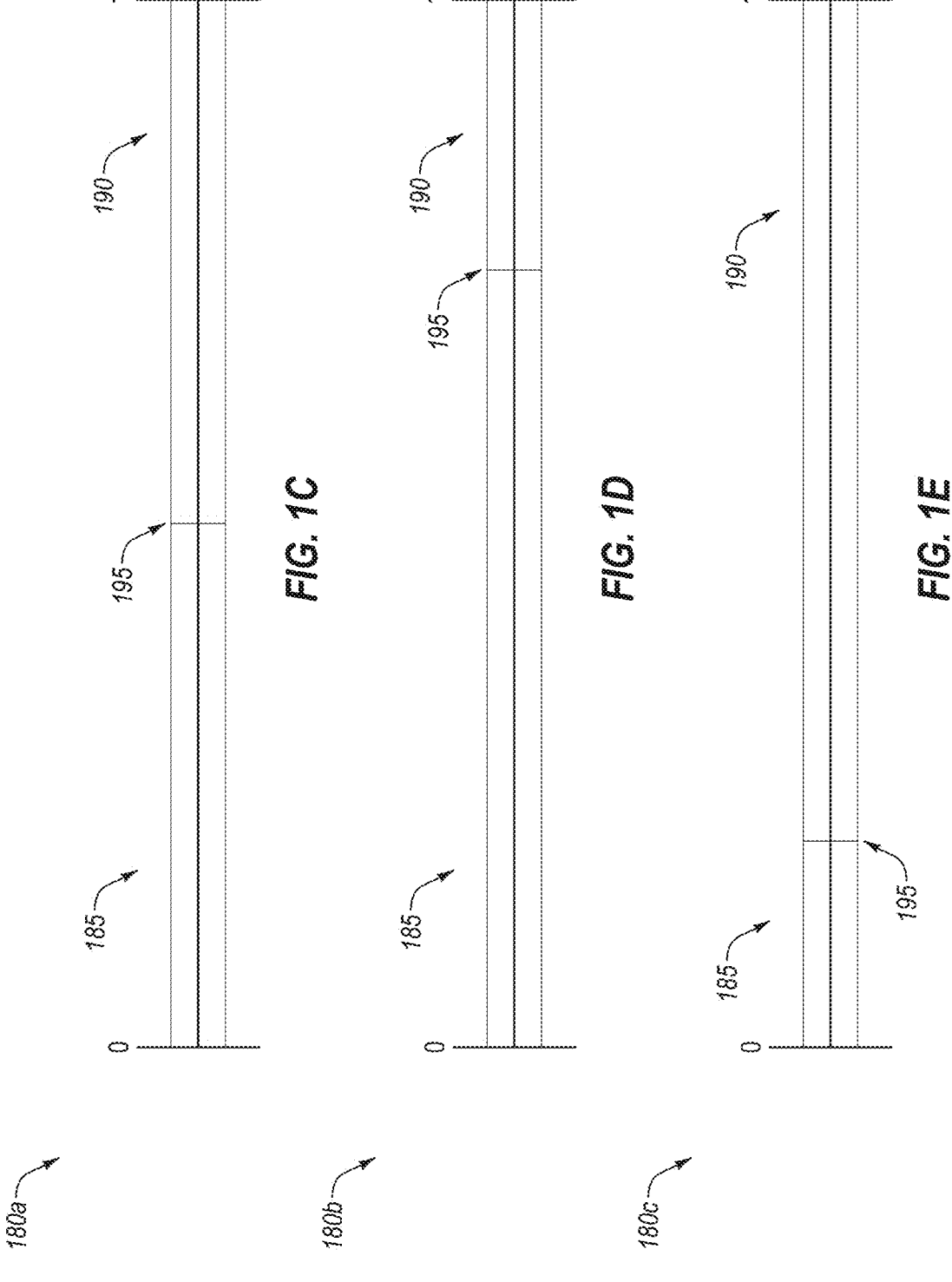

For example, in some embodiments, the second illumination state 118 may be compared against the second illumination scale. For example, FIG. 1C illustrates an example second illumination scale 180a, divided into at least a dark range 185 and an illuminated range 190. For instance, the second illumination scale 180a may range from 0 to 1 and the dark range 185 may range from 0 to a division point 195 and the illuminated range may range 190 from the division point 195 to 1. In some embodiments, the division point 195 may divide the second illumination scale 180*a* equally between the dark range 185 and the illuminated range 190 as depicted in FIG. 1C. In some embodiments, the scene-illumination estimator 120 may make a determination of the illumination state as the dark state in response to the second illumination state 118 falling within the dark range 185. In these or other embodiments, the scene-illumination estimator 120 may make the determination as the illuminated state in response to the second illumination state 118 falling within the illuminated range 190.

In some embodiments, the dark range 185 and the illuminated range 190 may vary in size according to the transitory position determined with respect to the first illumination scale 140. For example, the transitory position may reflect an amount of confidence that the scene-illumination estimator 120 may use from the second illumination state 118. For instance, in some situations, the transitory position may be closer to the first point 155 than to the second point 165 reflecting that the first illumination level is relatively close to the first threshold range 150. In these instances, the strength of evidence provided by the second illumination state 118 used to determine that the illumination state is the dark state may be relaxed. For example, the dark range 185 and the illuminated range 190 may be adjusted such that the dark range 185 covers a bigger range than the illuminated range 190 to make it easier for the second illumination state 118 to fall within the dark range. FIG. 1D illustrates another example second illumination scale 180*b* with the dark range 185 wider than the illuminated range 190 to illustrate such a scenario. For example, the division point 195 may be closer to 1 than 0, dividing the second illumination scale 180*b* to allow the dark range 185 to be wider than the illuminated range 190.

Similarly, as the transitory position moves further away from the first threshold range 150 and toward the second threshold range 160, the dark range may decrease in size and the illuminated range may increase in size. For example, FIG. 1E illustrates another example second illumination scale 180*c* with the dark range 185 narrower than the illuminated range 190 to illustrate such a scenario. For example, the division point 195 may be closer to 0 than 1, dividing the second illumination scale 180*c* for the dark range 185 is narrower than the illuminated range 190.

In some embodiments, the previous illumination state may be determined as the dark state. In these embodiments, the scene-illumination estimator 120 may be configured to confirm that the machine is traveling from a dark region toward an illuminated region. For example, the scene-illumination estimator 120 may seek from the illumination state 118 additional confidence to make the determination as the illuminated state. In these and other embodiments, the second illumination state 118 may be compared against the second illumination scale 180 with the dark range 185 and the illuminated range 190. The ranges of the dark range 185 and the illuminated range 190 may be determined according to the transitory position in a similar manner as an example above with the previous illumination state as the illuminated state. In these embodiments, the scene-illumination estimator 120 may determine the scene-illumination state 130 as the dark state in response to the second illumination state 118 falling within the dark range 185 and may determine the scene-illumination state as the illuminated state in response to the second illumination state 118 falling within the illuminated range 190.

Figure 2:
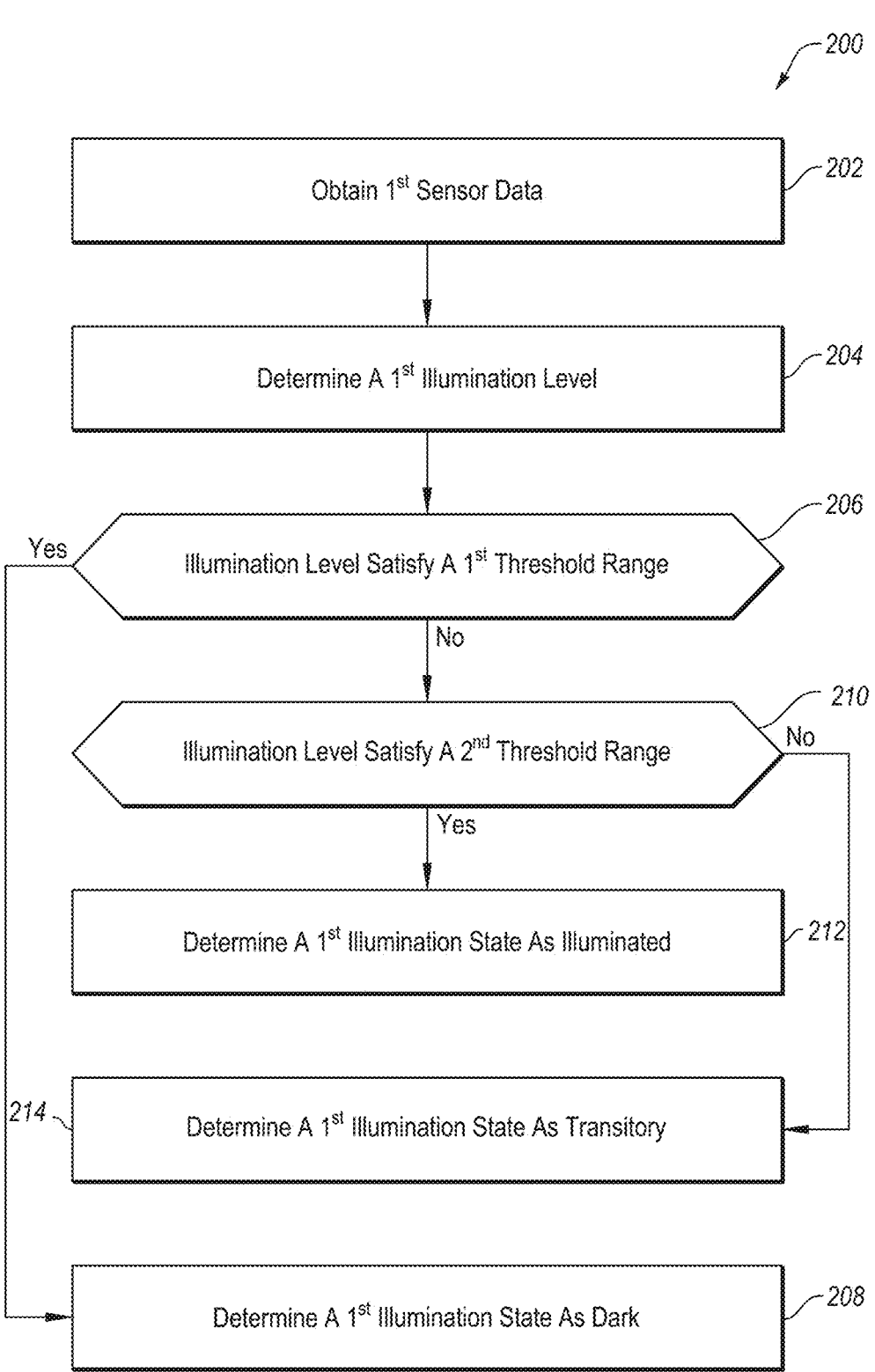
FIG. 2 is a flow diagram of an example method of determining an illumination state of a scene, in accordance with one or more embodiments of the present disclosure.

FIG. 2 is a flow diagram of an example method of determining an illumination state of a scene, in accordance with one or more embodiments of the present disclosure. One or more operations of the method 200 may be performed by any suitable system, apparatus, or device such as, for example, the system 100 and/or the illumination module 110 in FIGS. 1A-1E, the autonomous vehicle system(s) described with respect to FIGS. 4A-4D, computing device(s) described with respect to FIG. 5, and/or the data system(s) described with respect to FIG. 6 in the present disclosure.

The method 200 may include one or more blocks. Although illustrated with discrete blocks, the operations associated with one or more of the blocks of the method 200 may be divided into additional blocks, combined into fewer blocks, or eliminated, depending on the particular implementation.

In some embodiments, the method 200 may include block 202. At block 202, a first sensor data may be obtained. In some embodiments, the first sensor data may be obtained using a first illumination sensor corresponding to a machine. In some embodiments, the first illumination sensor may include any suitable system, apparatus, or device that may be used to obtain the first sensor data. The first sensor data may include any type of data representative of an amount of light in an area corresponding to the first illumination sensor.

For example, the first illumination sensor may include a camera configured to capture an image of a scene the machine is traveling toward. Additionally or alternatively, the first sensor data may include the image captured by the camera and/or the corresponding image data. Additionally or alternatively, the first illumination sensor may be configured to detect illumination levels relatively near the machine. For instance, the first illumination sensor may include a wide-view camera and/or a photoelectric sensor. The first illumination sensor 102 of FIG. 1A may be an example of the first illumination sensor.

At block 204, a first illumination level corresponding to the area may be determined based at least on the first sensor data. The first illumination level may provide an indication as to the amount of light or illumination that may be present in the area as indicated by the first sensor data. In some embodiments, the determination of the first illumination level may include one or more operations described with respect to FIGS. 1A and 1B corresponding to determining a first illumination level.

At block 206, it may be determined whether the first illumination level satisfies a first threshold range. In some embodiments, the first illumination level may satisfy the first threshold range by falling within the first threshold range on a first illumination scale. For example, in some embodiments, the first illumination scale may include at least the first threshold range and a second threshold range. The first threshold range and the second threshold range may each cover a different range of numbers within the first illumination scale. In some embodiments, the first illumination scale 140, the first threshold range 150, and the second threshold range 160 of FIG. 1B may be examples of the first illumination scale, the first threshold range and the second threshold range.

In response to the first illumination level satisfying the first threshold range, the method 200 may proceed to block 208. At block 208, a determination may be made that the illumination state of the scene is a dark state. In some embodiments, the determination may be made without using any illumination detections obtained using a second illumination detector. In some embodiments, the determining the illumination state may be as discussed and illustrated further in the present disclosure, such as with respect to FIGS. 1A and 1B.

In some embodiments, the first illumination level may not satisfy the first threshold range. For example, the first illumination level may not fall within the first threshold range. In these embodiments, the method 200 may proceed to block 210. At block 210, it may be determined whether the first illumination level satisfies the second threshold range. In some embodiments, the second threshold range may be satisfied by the first illumination level falling within the second threshold range.

In response to the first illumination level satisfying the second threshold range, the method 200 may proceed to block 212. At block 212, a determination of the illumination state of the scene as a illuminated state may be made. In some embodiments, the determination may be made without using any sensor data obtained using the second illumination sensor. Additionally or alternatively, the sensor data obtained using the second illumination sensor may be used to confirm the determination made using the first illumination level. In some embodiments, the determining of the illumination state may be as discussed and illustrated further in the present disclosure, such as with respect to FIGS. 1A and 1B.

Modifications, additions, or omissions may be made to the method 200 without departing from the scope of the present disclosure. For example, the operations of method 200 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 3:
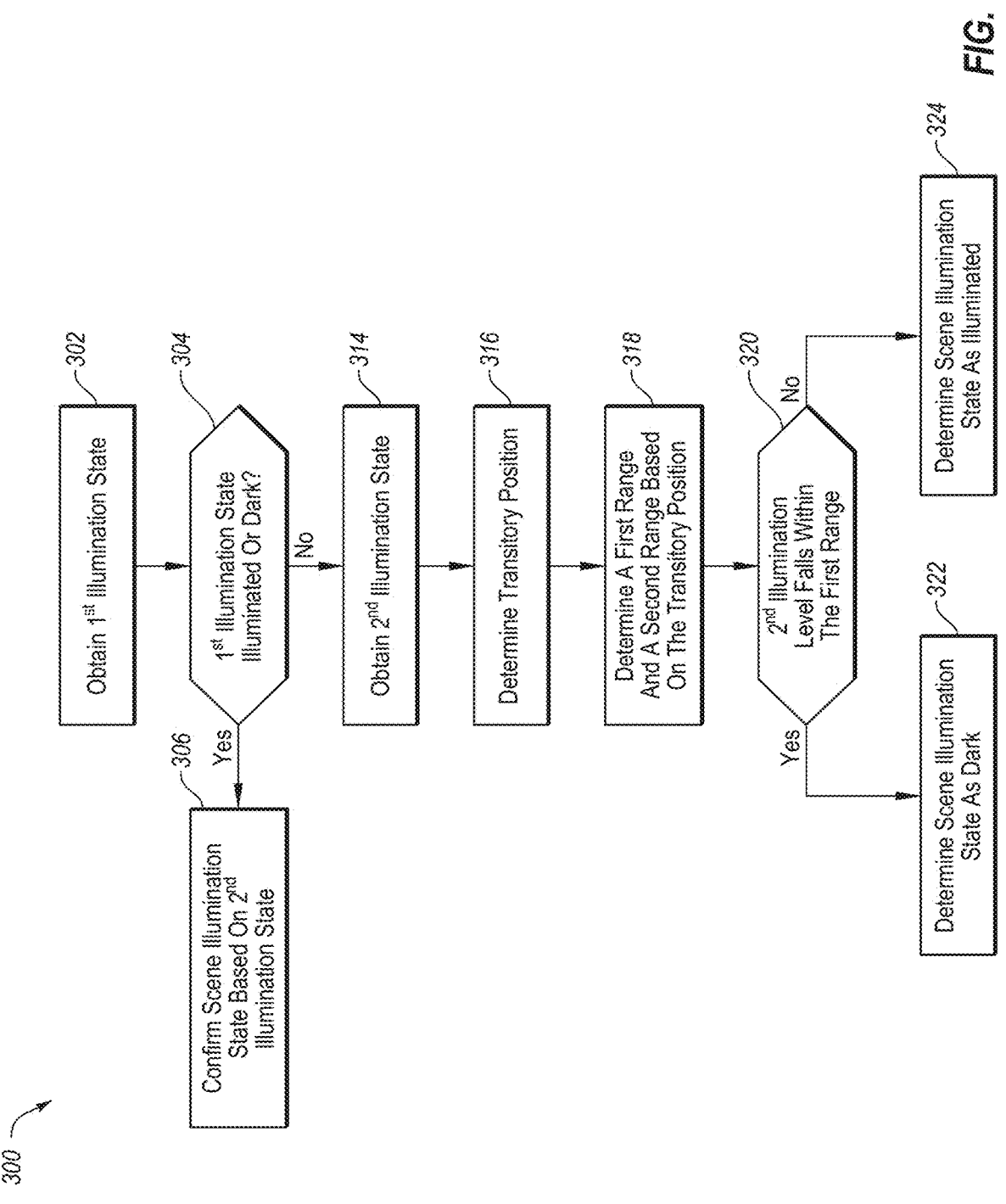
FIG. 3 is a flow diagram illustrating an example method for determining a scene-illumination state, in accordance with one or more embodiments of the present disclosure.

FIG. 3 is a flow diagram illustrating a method 300 for determining a scene-illumination state, in accordance with one or more embodiments of the present disclosure. In some embodiments, one or more of the operations of the method 300 may be performed with respect to the scene-illumination estimator 120 of FIG. 1A. One or more operations of the method 300 may be performed by any suitable system, apparatus, or device such as, for example, the system 100 and/or the illumination module 110 of FIG. 1A, the autonomous vehicle system(s) described with respect to FIGS. 4A-4D, computing device(s) described with respect to FIG. 5, and/or the data system(s) described with respect to FIG. 6 in the present disclosure.

The method 300 may include one or more blocks. Although illustrated with discrete blocks, the operations associated with one or more of the blocks of the method 300 may be divided into additional blocks, combined into fewer blocks, or eliminated, depending on the particular implementation. In some embodiment, the method 300 may be iterated and/or be performed at a certain rate. For example, the method 300 may be performed once a second, twice a second, three times a second, five times a second, ten times a second, twenty times a second, fifty times a second, etc.

In some embodiments, the method 300 may include block 301. At block 302, a first illumination state may be obtained. For example, the first illumination state may include a discrete representation of an illumination state of an area corresponding to a first illumination sensor. In these and other embodiments, the first illumination state may be one of dark, illuminated, and transitory. In some embodiments, the obtaining of the first illumination state may include one or more operations described with respect to FIG. 1A corresponding to determining the first illumination state 114.

At block 304, it may be determined whether the first illumination state is either dark or illuminated. In response to the first illumination state being dark or illuminated, the method 300 may proceed to block 306.

At block 306, the first illumination state may be confirmed based on a second illumination state. For example, the second illumination state may be obtained from a second detector which may determine the second illumination state based at least on a second sensor data obtained using a second illumination sensor. In these and other embodiments, the second illumination state may be represented in an analog representation. For example, the second illumination state may represent amount light in the second sensor data numerically as a number within a certain range (e.g., 0 to 1).

In some embodiments, the scene illumination state may be confirmed in response to the second illumination state satisfying a second detection threshold. For example, a confirmatory illumination scale may be applied to the second illumination state. The confirmatory illumination scale may be a range of number that may correspond to the certain range (e.g., 0 to 1). In these and other embodiments, the confirmatory illumination scale may include a confirmatory dark threshold or a confirmatory illuminated threshold. For instance, in response to the first illumination state being dark, the confirmatory dark threshold may be applied to the second illumination state and in response to the first illumination state being illuminated, the confirmatory illuminated threshold may be applied to the second illumination state. In these and other embodiments, in response to the second illumination state satisfying the second detection threshold, the scene-illumination state may be determined as the first-illumination state.

In some embodiments, the first illumination state may fail to be confirmed. For example, the second illumination state may not satisfy the second detection threshold. In these and other embodiments, the scene illumination state may remain unchanged from a previous illumination state. In these instances, the previous illumination state may refer to the scene-illumination state determined during a previous iteration of the method 300.

In some embodiments, the method 300 may not include block 306. For example, in response to the first illumination state being determined as either dark or illuminated at block 304, the scene illumination state may be determined as dark or illuminated, corresponding to the first illumination state, without confirming the scene illumination state based on the second illumination state.

In some embodiments, returning to block 304, the first illumination state may not be dark or illuminated. For example, the first illuminations state may be the transitory state. In these instances, the method 300 may proceed to block 314. At block 314, the second illumination state may be obtained. In some embodiments, the obtaining the second illumination state may include one or more operations described in block 306.

At block 316, a transitory position may be determined. The transitory position may provide indication of how far a first illumination level may be from a first threshold range or a second threshold range. In some embodiments, the determination of the transitory position may include one or more operations described with respect to FIGS. 1A and 1B corresponding to determining a transitory position.

At block 318, a first range and a second range may be determined based at least on the transitory position. In some embodiments, the first range and the second range may divide a second illumination scale based on the transitory position. In some embodiments, the first range may be a dark range and the second range may be an illuminated range. In some embodiments, the determination of the first range and the second range may include one or more operations described with respect to FIGS. 1A-1E corresponding to determining the dark range 185 and the illuminated range 190.

At block 320, it may be determined whether a second illumination level falls within the first range. In response to the second illumination level falling within the first range, the method 300 may proceed to block 322. At block 322, a determination may be made that the scene-illumination state is a dark state. In some embodiments, the determining the illumination state may be as discussed and illustrated further in the present disclosure, such as with respect to FIGS. 1A-1E.

In some embodiments, the second illumination level may not fall within the first range. For example, in some embodiments, the second illumination level may fall within the second range. In these embodiments, the method 300 may proceed to block 324. At block 324, a determination may be made that the scene-illumination state is an illuminated state. In some embodiments, the determining the illumination state may be as discussed and illustrated further in the present disclosure, such as with respect to FIGS. 1A-1E.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

For example, in some embodiments the method 300 may include controlling and/or operating one or more lighting components of the machine based at least on the scene-illumination state. For example, in instances with the scene-illumination state determined as the dark state, the one or more lighting components (e.g., headlights) of the machine may be turned on. In other instances, with the illumination state determined as the illuminated state, the one or more lighting components of the machine may be turned off.

Example Autonomous Vehicle

Figure 4A:
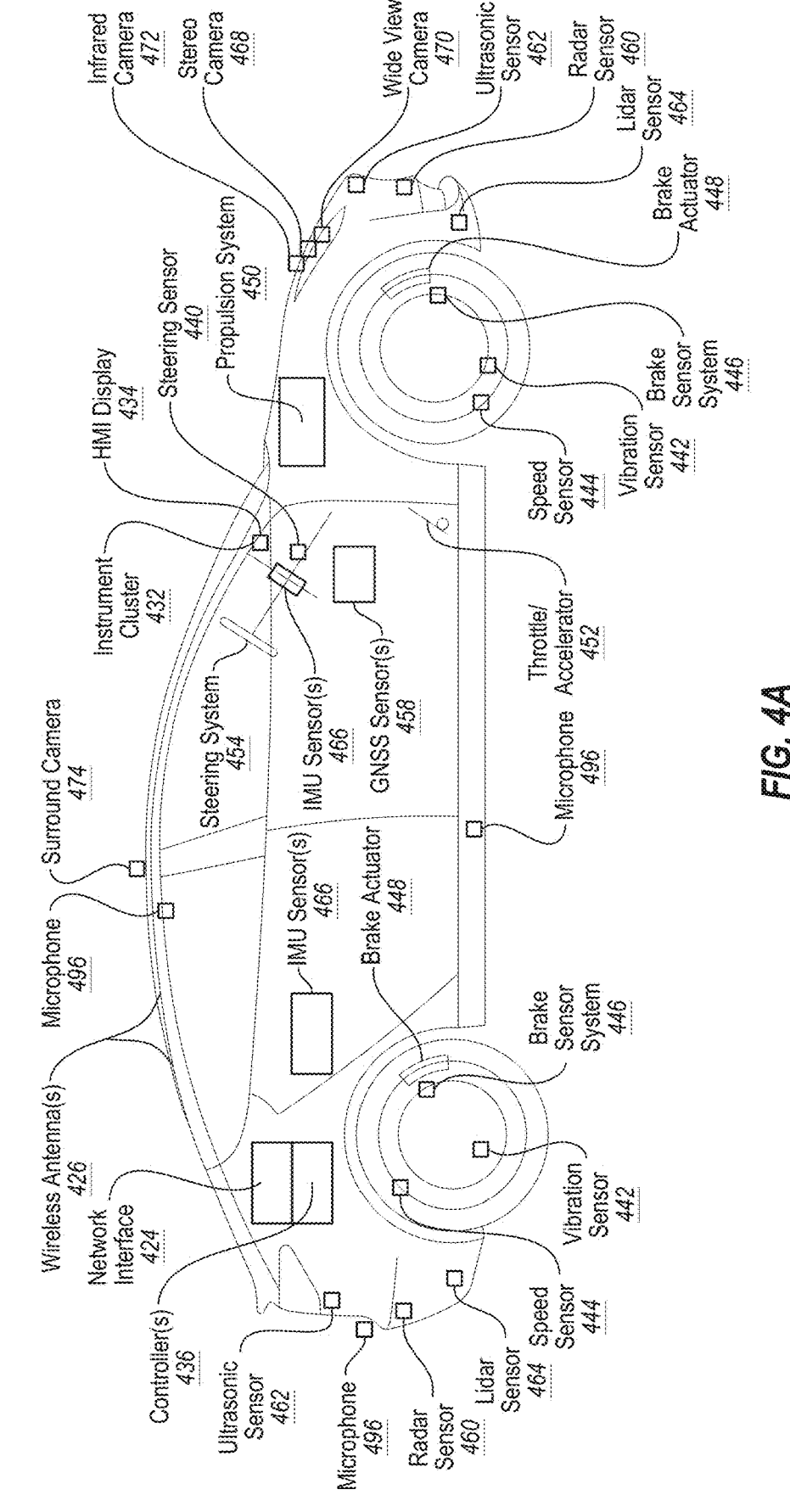
FIG. 4A is an illustration of an example autonomous vehicle, in accordance with one or more embodiments of the present disclosure.

FIG. 4A is an illustration of an example autonomous vehicle 400, in accordance with some embodiments of the present disclosure. The autonomous vehicle 400 (alternatively referred to herein as the "vehicle 400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 400 may be capable of functionality in accordance with one or more of Level 3-Level 5 of the autonomous driving levels. The vehicle 400 may be capable of functionality in accordance with one or more of Level 1-Level 5 of the autonomous driving levels. For example, the vehicle 400 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 400 or other machine, such as being fully autonomous, being highly autonomous, being conditionally autonomous, being partially autonomous, providing assistive autonomy, being semi-autonomous, being primarily autonomous, or other designation.

The vehicle 400 may include components such as a chassis, a vehicle body, wheels (e.g., 2, 4, 6, 8, 18, etc.), tires, axles, and other components of a vehicle. The vehicle 400 may include a propulsion system 450, such as an internal combustion engine, hybrid electric power plant, an all-electric engine, and/or another propulsion system type. The propulsion system 450 may be connected to a drive train of the vehicle 400, which may include a transmission, to enable the propulsion of the vehicle 400. The propulsion system 450 may be controlled in response to receiving signals from the throttle/accelerator 452.

A steering system 454, which may include a steering wheel, may be used to steer the vehicle 400 (e.g., along a desired path or route) when the propulsion system 450 is operating (e.g., when the vehicle is in motion). The steering system 454 may receive signals from a steering actuator 456. The steering wheel may be optional for full automation (Level 5) functionality.

The brake sensor system 446 may be used to operate the vehicle brakes in response to receiving signals from the brake actuators 448 and/or brake sensors.

Controller(s) 436, which may include one or more CPU(s), system on chips (SoCs) 404 (FIG. 4C) and/or GPU(s), may provide signals (e.g., representative of commands) to one or more components and/or systems of the vehicle 400. For example, the controller(s) may send signals to operate the vehicle brakes via one or more brake actuators 448, to operate the steering system 454 via one or more steering actuators 456, and/or to operate the propulsion system 450 via one or more throttle/accelerators 452. The controller(s) 436 may include one or more onboard (e.g., integrated) computing devices (e.g., supercomputers) that process sensor signals, and output operation commands (e.g., signals representing commands) to enable autonomous driving and/or to assist a human driver in driving the vehicle 400. The controller(s) 436 may include a first controller 436 for autonomous driving functions, a second controller 436 for functional safety functions, a third controller 436 for artificial intelligence functionality (e.g., computer vision), a fourth controller 436 for infotainment functionality, a fifth controller 436 for redundancy in emergency conditions, and/or other controllers. In some examples, a single controller 436 may handle two or more of the above functionalities, two or more controllers 436 may handle a single functionality, and/or any combination thereof.

The controller(s) 436 may provide the signals for controlling one or more components and/or systems of the vehicle 400 in response to sensor data received from one or more sensors (e.g., sensor inputs). The sensor data may be received from, for example and without limitation, global navigation satellite systems sensor(s) 458 (e.g., Global Positioning System sensor(s)), RADAR sensor(s) 460, ultrasonic sensor(s) 462, LIDAR sensor(s) 464, inertial measurement unit (IMU) sensor(s) 466 (e.g., accelerometer(s), gyroscope(s), magnetic compass(es), magnetometer(s), etc.), microphone(s) 496, stereo camera(s) 468, wide-view camera(s) 470 (e.g., fisheye cameras), infrared camera(s) 472, surround camera(s) 474 (e.g., 360 degree cameras), long-range and/or mid-range camera(s) 498, speed sensor(s) 444 (e.g., for measuring the speed of the vehicle 400), vibration sensor(s) 442, steering sensor(s) 440, brake sensor(s) 446 (e.g., as part of the brake sensor system 446), and/or other sensor types.

One or more of the controller(s) 436 may receive inputs (e.g., represented by input data) from an instrument cluster 432 of the vehicle 400 and provide outputs (e.g., represented by output data, display data, etc.) via a human-machine interface (HMI) display 434, an audible annunciator, a loudspeaker, and/or via other components of the vehicle 400. The outputs may include information such as vehicle velocity, speed, time, map data (e.g., the HD map 422 of FIG. 4C), location data (e.g., the location of the vehicle 400, such as on a map), direction, location of other vehicles (e.g., an occupancy grid), information about objects and status of objects as perceived by the controller(s) 436, etc. For example, the HMI display 434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 400 further includes a network interface 424, which may use one or more wireless antenna(s) 426 and/or modem(s) to communicate over one or more networks. For example, the network interface 424 may be capable of communication over LTE, WCDMA, UMTS, GSM, CDMA2000, etc. The wireless antenna(s) 426 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 4B:
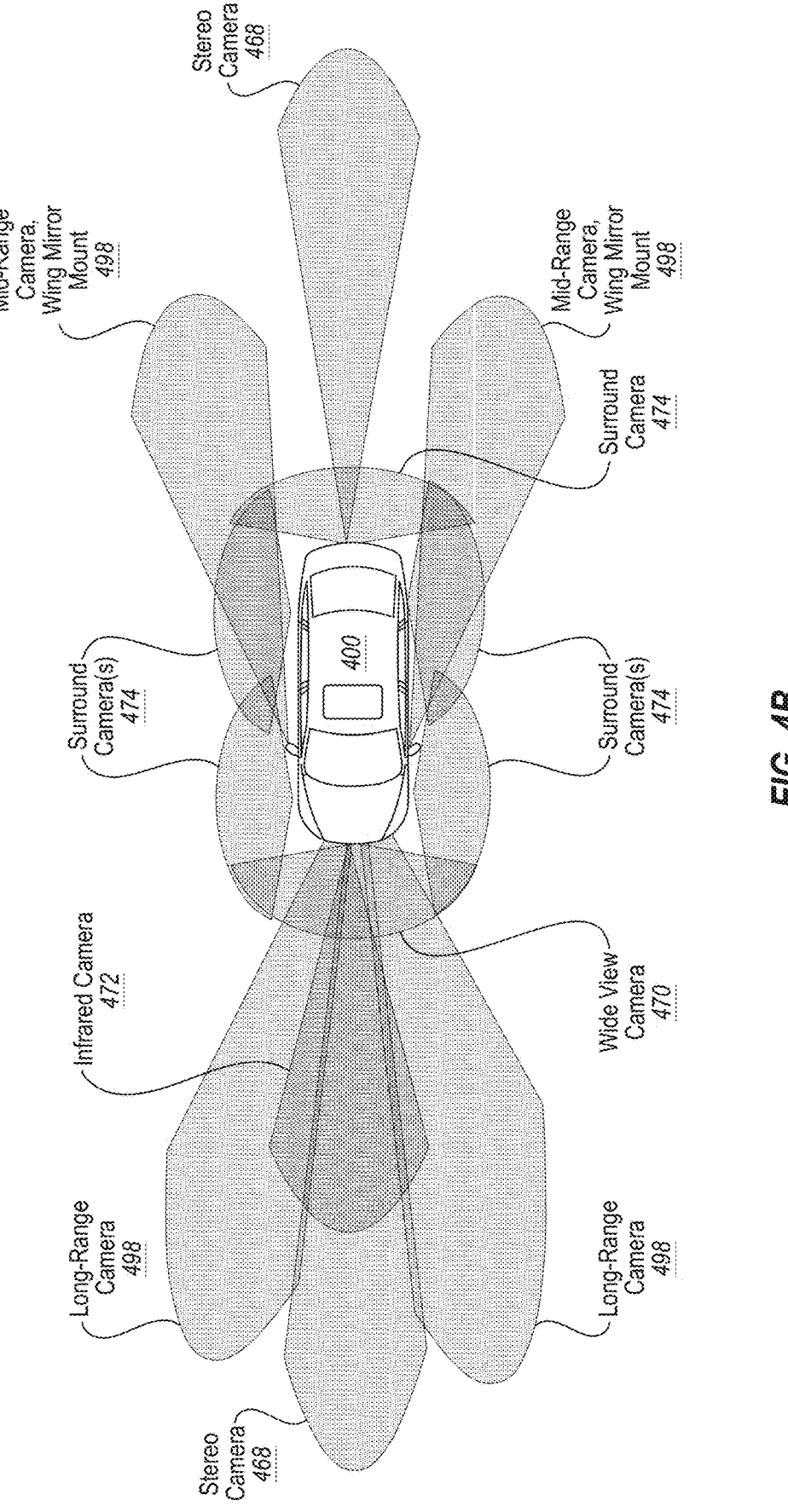
FIG. 4B is an example of camera locations and fields of view for the example autonomous vehicle of FIG. 4A, in accordance with one or more embodiments of the present disclosure.

FIG. 4B is an example of camera locations and fields of view for the example autonomous vehicle 400 of FIG. 4A, in accordance with some embodiments of the present disclosure. The cameras and respective fields of view are one example embodiment and are not intended to be limiting. For example, additional and/or alternative cameras may be included and/or the cameras may be located at different locations on the vehicle 400.

The camera types for the cameras may include, but are not limited to, digital cameras that may be adapted for use with the components and/or systems of the vehicle 400. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 400 (e.g., front-facing cameras) may be used for surround view, to help identify forward-facing paths and obstacles, as well aid in, with the help of one or more controllers 436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 470 that may be used to perceive objects coming into view from the periphery (e.g., pedestrians, crossing traffic or bicycles). Although only one wide-view camera is illustrated in FIG. 4B, there may any number of wide-view cameras 470 on the vehicle 400. In addition, long-range camera(s) 498 (e.g., a long-view stereo camera pair) may be used for depth-based object detection, especially for objects for which a neural network has not yet been trained. The long-range camera(s) 498 may also be used for object detection and classification, as well as basic object tracking.

One or more stereo cameras 468 may also be included in a front-facing configuration. The stereo camera(s) 468 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 468 may be used in addition to, or alternatively from, those described herein.

Cameras with a field of view that include portions of the environment to the side of the vehicle 400 (e.g., side-view cameras) may be used for surround view, providing information used to create and update the occupancy grid, as well as to generate side impact collision warnings. For example, surround camera(s) 474 (e.g., four surround cameras 474 as illustrated in FIG. 4B) may be positioned to on the vehicle 400. The surround camera(s) 474 may include wide-view camera(s) 470, fisheye camera(s), 360-degree camera(s), and/or the like. For example, four fisheye cameras may be positioned on the vehicle's front, rear, and sides. In an alternative arrangement, the vehicle may use three surround camera(s) 474 (e.g., left, right, and rear), and may leverage one or more other camera(s) (e.g., a forward-facing camera) as a fourth surround-view camera.

Cameras with a field of view that include portions of the environment to the rear of the vehicle 400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 498, stereo camera(s) 468), infrared camera(s) 472, etc.), as described herein.

Figure 4C:
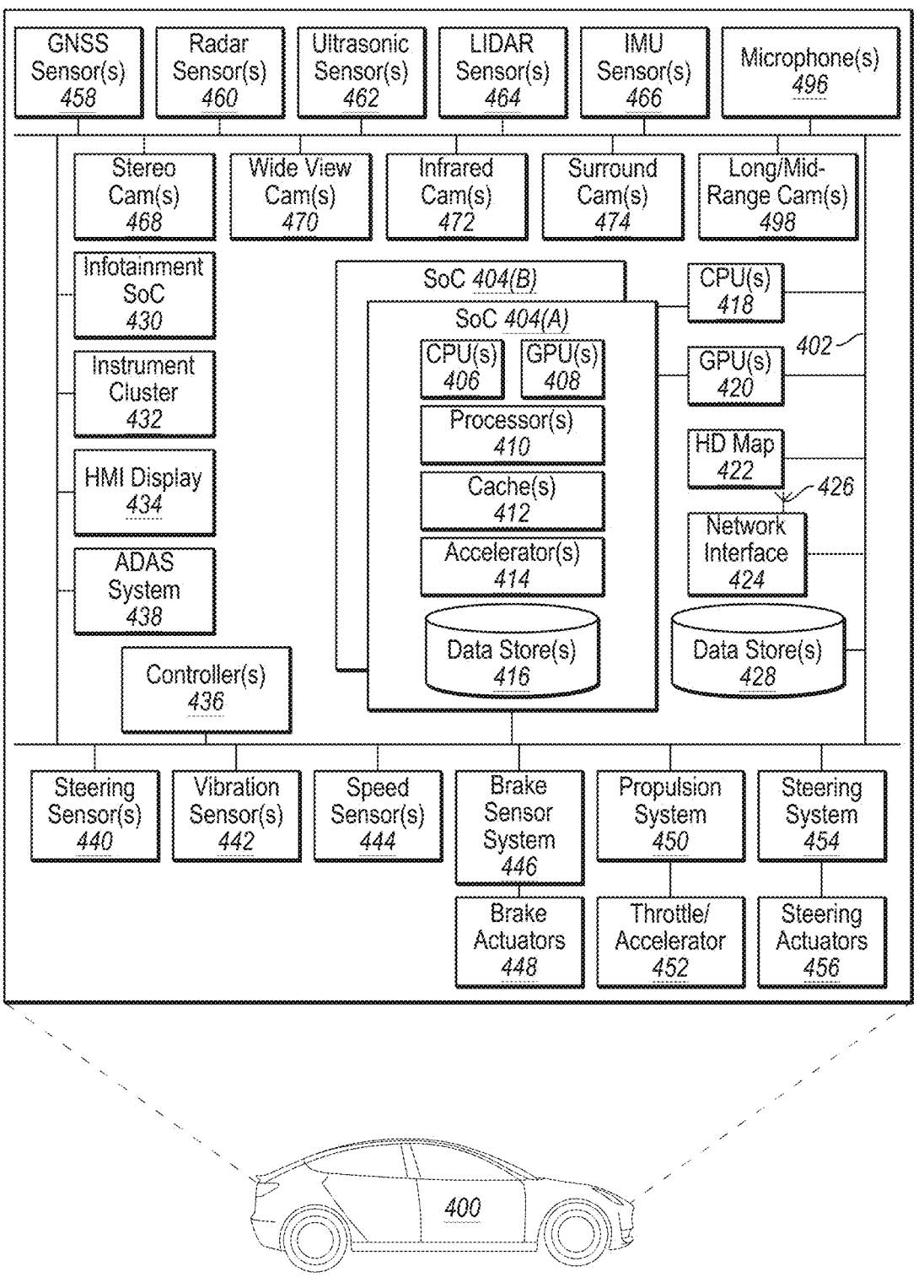
FIG. 4C is a block diagram of an example system architecture for the example autonomous vehicle of FIG. 4A, in accordance with one or more embodiments of the present disclosure.

FIG. 4C is a block diagram of an example system architecture for the example autonomous vehicle 400 of FIG. 4A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 400 in FIG. 4C is illustrated as being connected via bus 402. The bus 402 may include a Controller Area Network (CAN) data interface (alternatively referred to herein as a "CAN bus"). A CAN may be a network inside the vehicle 400 used to aid in control of various features and functionality of the vehicle 400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 402 is described herein as being a CAN bus, this is not intended to be limiting. For example, in addition to, or alternatively from, the CAN bus, FlexRay and/or Ethernet may be used. Additionally, although a single line is used to represent the bus 402, this is not intended to be limiting. For example, there may be any number of busses 402, which may include one or more CAN busses, one or more FlexRay busses, one or more Ethernet busses, and/or one or more other types of busses using a different protocol. In some examples, two or more busses 402 may be used to perform different functions, and/or may be used for redundancy. For example, a first bus 402 may be used for collision avoidance functionality and a second bus 402 may be used for actuation control. In any example, each bus 402 may communicate with any of the components of the vehicle 400, and two or more busses 402 may communicate with the same components. In some examples, each SoC 404, each controller 436, and/or each computer within the vehicle may have access to the same input data (e.g., inputs from sensors of the vehicle 400), and may be connected to a common bus, such the CAN bus.

The vehicle 400 may include one or more controller(s) 436, such as those described herein with respect to FIG. 4A. The controller(s) 436 may be used for a variety of functions. The controller(s) 436 may be coupled to any of the various other components and systems of the vehicle 400 and may be used for control of the vehicle 400, artificial intelligence of the vehicle 400, infotainment for the vehicle 400, and/or the like.

The vehicle 400 may include a system(s) on a chip (SoC) 404. The SoC 404 may include CPU(s) 406, GPU(s) 408, processor(s) 410, cache(s) 412, accelerator(s) 414, data store(s) 416, and/or other components and features not illustrated. The SoC(s) 404 may be used to control the vehicle 400 in a variety of platforms and systems. For example, the SoC(s) 404 may be combined in a system (e.g., the system of the vehicle 400) with an HD map 422 which may obtain map refreshes and/or updates via a network interface 424 from one or more servers (e.g., server(s) 478 of FIG. 4D).

The CPU(s) 406 may include a CPU cluster or CPU complex (alternatively referred to herein as a "CCPLEX"). The CPU(s) 406 may include multiple cores and/or L2 caches. For example, in some embodiments, the CPU(s) 406 may include eight cores in a coherent multi-processor configuration. In some embodiments, the CPU(s) 406 may include four dual-core clusters where each cluster has a dedicated L2 cache (e.g., a 2 MB L2 cache). The CPU(s) 406 (e.g., the CCPLEX) may be configured to support simultaneous cluster operation enabling any combination of the clusters of the CPU(s) 406 to be active at any given time.

The CPU(s) 406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 408 may include an integrated GPU (alternatively referred to herein as an "iGPU"). The GPU(s) 408 may be programmable and may be efficient for parallel workloads. The GPU(s) 408, in some examples, may use an enhanced tensor instruction set. The GPU(s) 408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 408 may include at least eight streaming microprocessors. The GPU(s) 408 may use compute application programming interface(s) (API(s)). In addition, the GPU(s) 408 may use one or more parallel computing platforms and/or programming models (e.g., NVIDIA's CUDA).

The GPU(s) 408 may be power-optimized for best performance in automotive and embedded use cases. For example, the GPU(s) 408 may be fabricated on a Fin field-effect transistor (FinFET). However, this is not intended to be limiting, and the GPU(s) 408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 408 to access the CPU(s) 406 page tables directly. In such examples, when the GPU(s) 408 memory management unit (MMU) experiences a miss, an address translation request may be transmitted to the CPU(s) 406. In response, the CPU(s) 406 may look in its page tables for the virtual-to-physical mapping for the address and transmits the translation back to the GPU(s) 408. As such, unified memory technology may allow a single unified virtual address space for memory of both the CPU(s) 406 and the GPU(s) 408, thereby simplifying the GPU(s) 408 programming and porting of applications to the GPU(s) 408.

In addition, the GPU(s) 408 may include an access counter that may keep track of the frequency of access of the GPU(s) 408 to memory of other processors. The access counter may help ensure that memory pages are moved to the physical memory of the processor that is accessing the pages most frequently.

The SoC(s) 404 may include any number of cache(s) 412, including those described herein. For example, the cache(s) 412 may include an L3 cache that is available to both the CPU(s) 406 and the GPU(s) 408 (e.g., that is connected to both the CPU(s) 406 and the GPU(s) 408). The cache(s) 412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 404 may include an arithmetic logic unit(s) (ALU(s)) which may be leveraged in performing processing with respect to any of the variety of tasks or operations of the vehicle 400—such as processing DNNs. In addition, the SoC(s) 404 may include a floating-point unit(s) (FPU(s))—or other math coprocessor or numeric coprocessor types—for performing mathematical operations within the system. For example, the SoC(s) 104 may include one or more FPUs integrated as execution units within a CPU(s) 406 and/or GPU(s) 408.

The SoC(s) 404 may include one or more accelerators 414 (e.g., hardware accelerators, software accelerators, or a combination thereof). For example, the SoC(s) 404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 408 and to off-load some of the tasks of the GPU(s) 408 (e.g., to free up more cycles of the GPU(s) 408 for performing other tasks). As an example, the accelerator(s) 414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating-point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 408, and by using an inference accelerator, for example, a designer may target either the DLA(s) or the GPU(s) 408 for any function. For example, the designer may focus processing of CNNs and floating-point operations on the DLA(s) and leave other functions to the GPU(s) 408 and/or other accelerator(s) 414.

The accelerator(s) 414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 414 (e.g., the hardware acceleration cluster) may include a computer vision network on-chip and SRAM, for providing a high-bandwidth, low latency SRAM for the accelerator(s) 414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to processed RADAR. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 466 output that correlates with the vehicle 400 orientation, distance, 3D location estimates of the object obtained from the neural network and/or other sensors (e.g., LIDAR sensor(s) 464 or RADAR sensor(s) 460), among others.

The SoC(s) 404 may include data store(s) 416 (e.g., memory). The data store(s) 416 may be on-chip memory of the SoC(s) 404, which may store neural networks to be executed on the GPU and/or the DLA. In some examples, the data store(s) 416 may be large enough in capacity to store multiple instances of neural networks for redundancy and safety. The data store(s) 416 may comprise L2 or L3 cache(s) 412. Reference to the data store(s) 416 may include reference to the memory associated with the PVA, DLA, and/or other accelerator(s) 414, as described herein.

The SoC(s) 404 may include one or more processor(s) 410 (e.g., embedded processors). The processor(s) 410 may include a boot and power management processor that may be a dedicated processor and subsystem to handle boot power and management functions and related security enforcement. The boot and power management processor may be a part of the SoC(s) 404 boot sequence and may provide runtime power management services. The boot power and management processor may provide clock and voltage programming, assistance in system low power state transitions, management of SoC(s) 404 thermals and temperature sensors, and/or management of the SoC(s) 404 power states. Each temperature sensor may be implemented as a ring-oscillator whose output frequency is proportional to temperature, and the SoC(s) 404 may use the ring-oscillators to detect temperatures of the CPU(s) 406, GPU(s) 408, and/or accelerator(s) 414. If temperatures are determined to exceed a threshold, the boot and power management processor may enter a temperature fault routine and put the SoC(s) 404 into a lower power state and/or put the vehicle 400 into a chauffeur to safe-stop mode (e.g., bring the vehicle 400 to a safe stop).

The processor(s) 410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 410 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 410 may further include a real-time camera engine that may include a dedicated processor subsystem for handling real-time camera management.

The processor(s) 410 may further include a high dynamic range signal processor that may include an image signal processor that is a hardware engine that is part of the camera processing pipeline.

The processor(s) 410 may include a video image compositor that may be a processing block (e.g., implemented on a microprocessor) that implements video post-processing functions needed by a video playback application to produce the final image for the player window. The video image compositor may perform lens distortion correction on wide-view camera(s) 470, surround camera(s) 474, and/or on in-cabin monitoring camera sensors. An in-cabin monitoring camera sensor is preferably monitored by a neural network running on another instance of the Advanced SoC, configured to identify in-cabin events and respond accordingly. In-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 408 is not required to continuously render new surfaces. Even when the GPU(s) 408 is powered on and active doing 3D rendering, the video image compositor may be used to offload the GPU(s) 408 to improve performance and responsiveness.

The SoC(s) 404 may further include a mobile industry processor interface (MIPI) camera serial interface for receiving video and input from cameras, a high-speed interface, and/or a video input block that may be used for camera and related pixel input functions. The SoC(s) 404 may further include an input/output controller(s) that may be controlled by software and may be used for receiving I/O signals that are uncommitted to a specific role.

The SoC(s) 404 may further include a broad range of peripheral interfaces to enable communication with peripherals, audio codecs, power management, and/or other devices. The SoC(s) 404 may be used to process data from cameras (e.g., connected over Gigabit Multimedia Serial Link and Ethernet), sensors (e.g., LIDAR sensor(s) 464, RADAR sensor(s) 460, etc. that may be connected over Ethernet), data from bus 402 (e.g., speed of vehicle 400, steering wheel position, etc.), data from GNSS sensor(s) 458 (e.g., connected over Ethernet or CAN bus). The SoC(s) 404 may further include dedicated high-performance mass storage controllers that may include their own DMA engines, and that may be used to free the CPU(s) 406 from routine data management tasks.

The SoC(s) 404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 404 may be faster, more reliable, and even more energy-efficient and space-efficient than conventional systems. For example, the accelerator(s) 414, when combined with the CPU(s) 406, the GPU(s) 408, and the data store(s) 416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 420) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 408.

In some examples, a CNN for facial recognition and vehicle owner identification may use data from camera sensors to identify the presence of an authorized driver and/or owner of the vehicle 400. The always-on sensor processing engine may be used to unlock the vehicle when the owner approaches the driver door and turn on the lights, and, in security mode, to disable the vehicle when the owner leaves the vehicle. In this way, the SoC(s) 404 provide for security against theft and/or carjacking.

In another example, a CNN for emergency vehicle detection and identification may use data from microphones 496 to detect and identify emergency vehicle sirens. In contrast to conventional systems, that use general classifiers to detect sirens and manually extract features, the SoC(s) 404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 462, until the emergency vehicle(s) passes.

The vehicle may include a CPU(s) 418 (e.g., discrete CPU(s), or dCPU(s)), that may be coupled to the SoC(s) 404 via a high-speed interconnect (e.g., PCIe). The CPU(s) 418 may include an X86 processor, for example. The CPU(s) 418 may be used to perform any of a variety of functions, including arbitrating potentially inconsistent results between ADAS sensors and the SoC(s) 404, and/or monitoring the status and health of the controller(s) 436 and/or infotainment SoC 430, for example.

The vehicle 400 may include a GPU(s) 420 (e.g., discrete GPU(s), or dGPU(s)), that may be coupled to the SoC(s) 404 via a high-speed interconnect (e.g., NVIDIA's NVLINK). The GPU(s) 420 may provide additional artificial intelligence functionality, such as by executing redundant and/or different neural networks, and may be used to train and/or update neural networks based on input (e.g., sensor data) from sensors of the vehicle 400.

The vehicle 400 may further include the network interface 424 which may include one or more wireless antennas 426 (e.g., one or more wireless antennas for different communication protocols, such as a cellular antenna, a Bluetooth antenna, etc.). The network interface 424 may be used to enable wireless connectivity over the Internet with the cloud (e.g., with the server(s) 478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 400 information about vehicles in proximity to the vehicle 400 (e.g., vehicles in front of, on the side of, and/or behind the vehicle 400). This functionality may be part of a cooperative adaptive cruise control functionality of the vehicle 400.

The network interface 424 may include a SoC that provides modulation and demodulation functionality and enables the controller(s) 436 to communicate over wireless networks. The network interface 424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 400 may further include data store(s) 428, which may include off-chip (e.g., off the SoC(s) 404) storage. The data store(s) 428 may include one or more storage elements including RAM, SRAM, DRAM, VRAM, Flash, hard disks, and/or other components and/or devices that may store at least one bit of data.

The vehicle 400 may further include GNSS sensor(s) 458. The GNSS sensor(s) 458 (e.g., GPS, assisted GPS sensors, differential GPD (DGPS) sensors, etc.), to assist in mapping, perception, occupancy grid generation, and/or path planning functions. Any number of GNSS sensor(s) 458 may be used, including, for example and without limitation, a GPS using a USB connector with an Ethernet to Serial (RS-232) bridge.

The vehicle 400 may further include RADAR sensor(s) 460. The RADAR sensor(s) 460 may be used by the vehicle 400 for long-range vehicle detection, even in darkness and/or severe weather conditions. RADAR functional safety levels may be ASIL B. The RADAR sensor(s) 460 may use the CAN and/or the bus 402 (e.g., to transmit data generated by the RADAR sensor(s) 460) for control and to access object tracking data, with access to Ethernet to access raw data, in some examples. A wide variety of RADAR sensor types may be used. For example, and without limitation, the RADAR sensor(s) 460 may be suitable for front, rear, and side RADAR use. In some example, Pulse Doppler RADAR sensor(s) are used.

The RADAR sensor(s) 460 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 400 surrounding at higher speeds with minimal interference from traffic in adjacent lanes. The other two antennae may expand the field of view, making it possible to quickly detect vehicles entering or leaving the vehicle's 400 lane.

Mid-range RADAR systems may include, as an example, a range of up to 160 m (front) or 80 m (rear), and a field of view of up to 42 degrees (front) or 150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 400 may further include ultrasonic sensor(s) 462. The ultrasonic sensor(s) 462, which may be positioned at the front, back, and/or the sides of the vehicle 400, may be used for park assist and/or to create and update an occupancy grid. A wide variety of ultrasonic sensor(s) 462 may be used, and different ultrasonic sensor(s) 462 may be used for different ranges of detection (e.g., 2.5 m, 4 m). The ultrasonic sensor(s) 462 may operate at functional safety levels of ASIL B.

The vehicle 400 may include LIDAR sensor(s) 464. The LIDAR sensor(s) 464 may be used for object and pedestrian detection, emergency braking, collision avoidance, and/or other functions. The LIDAR sensor(s) 464 may be functional safety level ASIL B. In some examples, the vehicle 400 may include multiple LIDAR sensors 464 (e.g., two, four, six, etc.) that may use Ethernet (e.g., to provide data to a Gigabit Ethernet switch).

In some examples, the LIDAR sensor(s) 464 may be capable of providing a list of objects and their distances for a 360-degree field of view. Commercially available LIDAR sensor(s) 464 may have an advertised range of approximately 100 m, with an accuracy of 2 cm-3 cm, and with support for a 100 Mbps Ethernet connection, for example. In some examples, one or more non-protruding LIDAR sensors 464 may be used. In such examples, the LIDAR sensor(s) 464 may be implemented as a small device that may be embedded into the front, rear, sides, and/or corners of the vehicle 400. The LIDAR sensor(s) 464, in such examples, may provide up to a 120-degree horizontal and 35-degree vertical field-of-view, with a 200 m range even for low-reflectivity objects. Front-mounted LIDAR sensor(s) 464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 400. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 464 may be less susceptible to motion blur, vibration, and/or shock.

The vehicle may further include IMU sensor(s) 466. The IMU sensor(s) 466 may be located at a center of the rear axle of the vehicle 400, in some examples. The IMU sensor(s) 466 may include, for example and without limitation, an accelerometer(s), a magnetometer(s), a gyroscope(s), a magnetic compass(es), and/or other sensor types. In some examples, such as in six-axis applications, the IMU sensor(s) 466 may include accelerometers and gyroscopes, while in nine-axis applications, the IMU sensor(s) 466 may include accelerometers, gyroscopes, and magnetometers.

In some embodiments, the IMU sensor(s) 466 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 466 may enable the vehicle 400 to estimate heading without requiring input from a magnetic sensor by directly observing and correlating the changes in velocity from GPS to the IMU sensor(s) 466. In some examples, the IMU sensor(s) 466 and the GNSS sensor(s) 458 may be combined in a single integrated unit.

The vehicle may include microphone(s) 496 placed in and/or around the vehicle 400. The microphone(s) 496 may be used for emergency vehicle detection and identification, among other things.

The vehicle may further include any number of camera types, including stereo camera(s) 468, wide-view camera(s) 470, infrared camera(s) 472, surround camera(s) 474, long-range and/or mid-range camera(s) 498, and/or other camera types. The cameras may be used to capture image data around an entire periphery of the vehicle 400. The types of cameras used depends on the embodiments and requirements for the vehicle 400, and any combination of camera types may be used to provide the necessary coverage around the vehicle 400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 4A and FIG. 4B.

The vehicle 400 may further include vibration sensor(s) 442. The vibration sensor(s) 442 may measure vibrations of components of the vehicle, such as the axle(s). For example, changes in vibrations may indicate a change in road surfaces. In another example, when two or more vibration sensors 442 are used, the differences between the vibrations may be used to determine friction or slippage of the road surface (e.g., when the difference in vibration is between a power-driven axle and a freely rotating axle).

The vehicle 400 may include an ADAS system 438. The ADAS system 438 may include a SoC, in some examples. The ADAS system 438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 460, LIDAR sensor(s) 464, and/or a camera(s). The ACC systems may include longitudinal ACC and/or lateral ACC. Longitudinal ACC monitors and controls the distance to the vehicle immediately ahead of the vehicle 400 and automatically adjust the vehicle speed to maintain a safe distance from vehicles ahead. Lateral ACC performs distance keeping, and advises the vehicle 400 to change lanes when necessary. Lateral ACC is related to other ADAS applications such as LCA and CWS.

CACC uses information from other vehicles that may be received via the network interface 424 and/or the wireless antenna(s) 426 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 400), while the I2V communication concept provides information about traffic further ahead. CACC systems may include either or both I2V and V2V information sources. Given the information of the vehicles ahead of the vehicle 400, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 400 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 400 if the vehicle 400 starts to exit the lane. BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s).

RCTW systems may provide visual, audible, and/or tactile notification when an object is detected outside the rear-camera range when the vehicle 400 is backing up. Some RCTW systems include AEB to ensure that the vehicle brakes are applied to avoid a crash. RCTW systems may use one or more rear-facing RADAR sensor(s) 460, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 400, the vehicle 400 itself must, in the case of conflicting results, decide whether to heed the result from a primary computer or a secondary computer (e.g., a first controller 436 or a second controller 436). For example, in some embodiments, the ADAS system 438 may be a backup and/or secondary computer for providing perception information to a backup computer rationality module. The backup computer rationality monitor may run a redundant diverse software on hardware components to detect faults in perception and dynamic driving tasks. Outputs from the ADAS system 438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 404.

In other examples, ADAS system 438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 438 may be fed into the primary computer's perception block and/or the primary computer's dynamic driving task block. For example, if the ADAS system 438 indicates a forward crash warning due to an object immediately ahead, the perception block may use this information when identifying objects. In other examples, the secondary computer may have its own neural network that is trained and thus reduces the risk of false positives, as described herein.

The vehicle 400 may further include the infotainment SoC 430 (e.g., an in-vehicle infotainment system (IVI)). Although illustrated and described as an SoC, the infotainment system may not be a SoC, and may include two or more discrete components. The infotainment SoC 430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 400. For example, the infotainment SoC 430 may include radios, disk players, navigation systems, video players, USB and Bluetooth connectivity, carputers, in-car entertainment, Wi-Fi, steering wheel audio controls, hands-free voice control, a heads-up display (HUD), an HMI display 434, a telematics device, a control panel (e.g., for controlling and/or interacting with various components, features, and/or systems), and/or other components. The infotainment SoC 430 may further be used to provide information (e.g., visual and/or audible) to a user(s) of the vehicle, such as information from the ADAS system 438, autonomous driving information such as planned vehicle maneuvers, trajectories, surrounding environment information (e.g., intersection information, vehicle information, road information, etc.), and/or other information.

The infotainment SoC 430 may include GPU functionality. The infotainment SoC 430 may communicate over the bus 402 (e.g., CAN bus, Ethernet, etc.) with other devices, systems, and/or components of the vehicle 400. In some examples, the infotainment SoC 430 may be coupled to a supervisory MCU such that the GPU of the infotainment system may perform some self-driving functions in the event that the primary controller(s) 436 (e.g., the primary and/or backup computers of the vehicle 400) fail. In such an example, the infotainment SoC 430 may put the vehicle 400 into a chauffeur to safe-stop mode, as described herein.

The vehicle 400 may further include an instrument cluster 432 (e.g., a digital dash, an electronic instrument cluster, a digital instrument panel, etc.). The instrument cluster 432 may include a controller and/or supercomputer (e.g., a discrete controller or supercomputer). The instrument cluster 432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 430 and the instrument cluster 432. In other words, the instrument cluster 432 may be included as part of the infotainment SoC 430, or vice versa.

Figure 4D:
FIG. 4D is a system diagram for communication between cloud-based server(s) and the example autonomous vehicle of FIG. 4A, in accordance with one or more embodiments of the present disclosure.

FIG. 4D is a system diagram for communication between cloud-based server(s) and the example autonomous vehicle 400 of FIG. 4A, in accordance with some embodiments of the present disclosure. The system 476 may include server(s) 478, network(s) 490, and vehicles, including the vehicle 400. The server(s) 478 may include a plurality of GPUs 484(A)-484(H) (collectively referred to herein as GPUs 484), PCIe switches 482(A)-482(H) (collectively referred to herein as PCIe switches 482), and/or CPUs 480(A)-480(B) (collectively referred to herein as CPUs 480). The GPUs 484, the CPUs 480, and the PCIe switches may be interconnected with high-speed interconnects such as, for example and without limitation, NVLink interfaces 488 developed by NVIDIA and/or PCIe connections 486. In some examples, the GPUs 484 are connected via NVLink and/or NVSwitch SoC and the GPUs 484 and the PCIe switches 482 are connected via PCIe interconnects. Although eight GPUs 484, two CPUs 480, and two PCIe switches are illustrated, this is not intended to be limiting. Depending on the embodiment, each of the server(s) 478 may include any number of GPUs 484, CPUs 480, and/or PCIe switches. For example, the server(s) 478 may each include eight, sixteen, thirty-two, and/or more GPUs 484.

The server(s) 478 may receive, over the network(s) 490 and from the vehicles, image data representative of images showing unexpected or changed road conditions, such as recently commenced road work. The server(s) 478 may transmit, over the network(s) 490 and to the vehicles, neural networks 492, updated neural networks 492, and/or map information 494, including information regarding traffic and road conditions. The updates to the map information 494 may include updates for the HD map 422, such as information regarding construction sites, potholes, detours, flooding, and/or other obstructions. In some examples, the neural networks 492, the updated neural networks 492, and/or the map information 494 may have resulted from new training and/or experiences represented in data received from any number of vehicles in the environment, and/or based on training performed at a datacenter (e.g., using the server(s) 478 and/or other servers).

The server(s) 478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 490, and/or the machine learning models may be used by the server(s) 478 to remotely monitor the vehicles.

In some examples, the server(s) 478 may receive data from the vehicles and apply the data to up-to-date real-time neural networks for real-time intelligent inferencing. The server(s) 478 may include deep-learning supercomputers and/or dedicated AI computers powered by GPU(s) 484, such as a DGX and DGX Station machines developed by NVIDIA. However, in some examples, the server(s) 478 may include deep learning infrastructure that use only CPU-powered datacenters.

The deep-learning infrastructure of the server(s) 478 may be capable of fast, real-time inferencing, and may use that capability to evaluate and verify the health of the processors, software, and/or associated hardware in the vehicle 400. For example, the deep-learning infrastructure may receive periodic updates from the vehicle 400, such as a sequence of images and/or objects that the vehicle 400 has located in that sequence of images (e.g., via computer vision and/or other machine learning object classification techniques). The deep-learning infrastructure may run its own neural network to identify the objects and compare them with the objects identified by the vehicle 400 and, if the results do not match and the infrastructure concludes that the AI in the vehicle 400 is malfunctioning, the server(s) 478 may transmit a signal to the vehicle 400 instructing a fail-safe computer of the vehicle 400 to assume control, notify the passengers, and complete a safe parking maneuver.

For inferencing, the server(s) 478 may include the GPU(s) 484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 5:
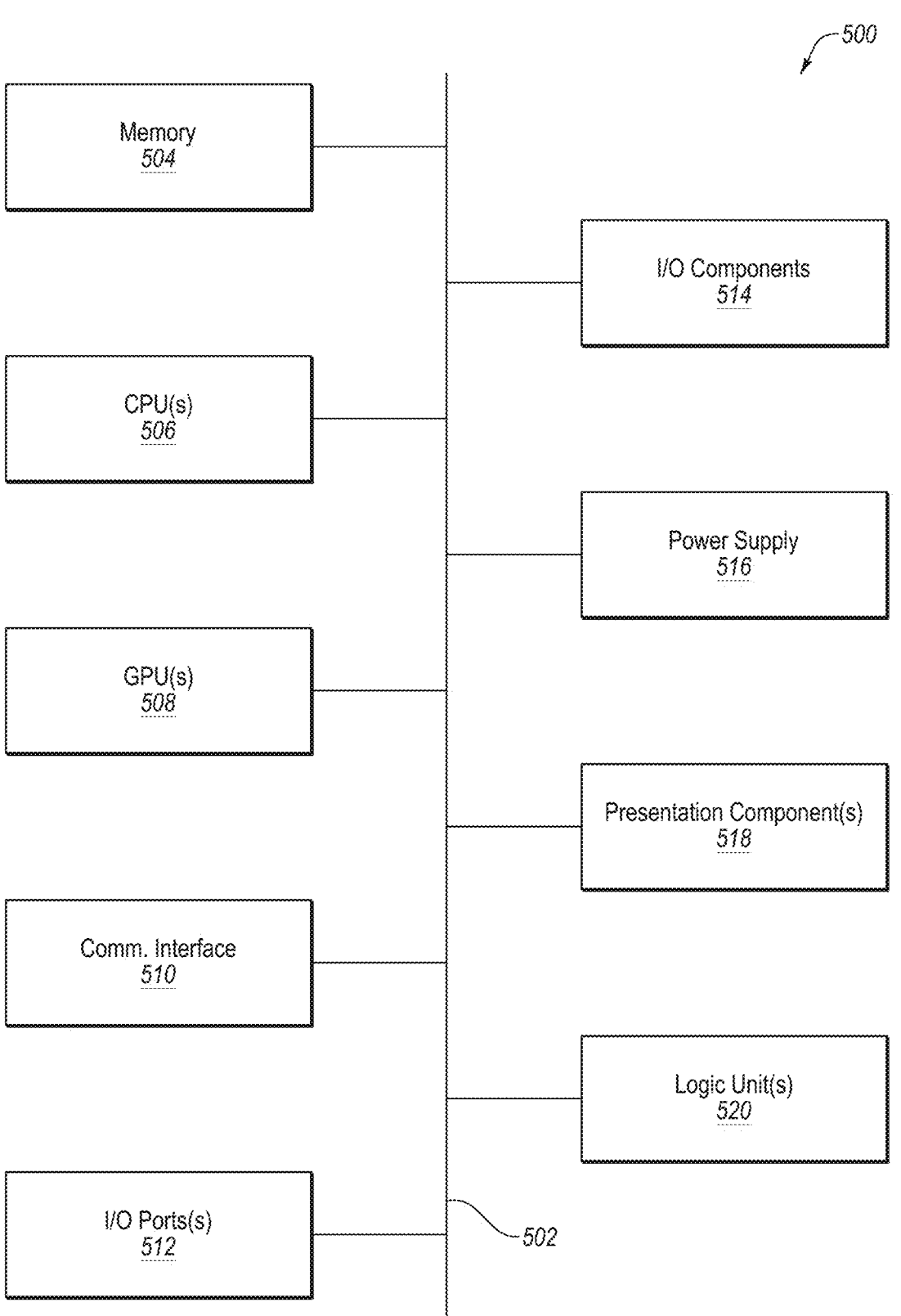
FIG. 5 is a block diagram of an example computing device suitable for use in implementing one or more embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point, connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, include wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail in the present disclosure) associated with a display of the computing device 500. The computing device 500 may include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

Example Data Center

Figure 6:
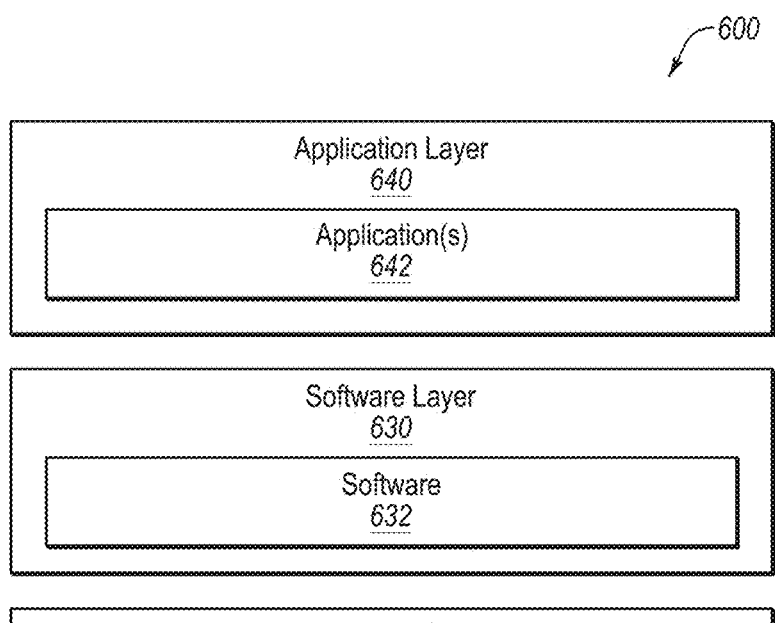
FIG. 6 is a block diagram of an example data center suitable for use in implementing one or more embodiments of the present disclosure.
Figure 6:
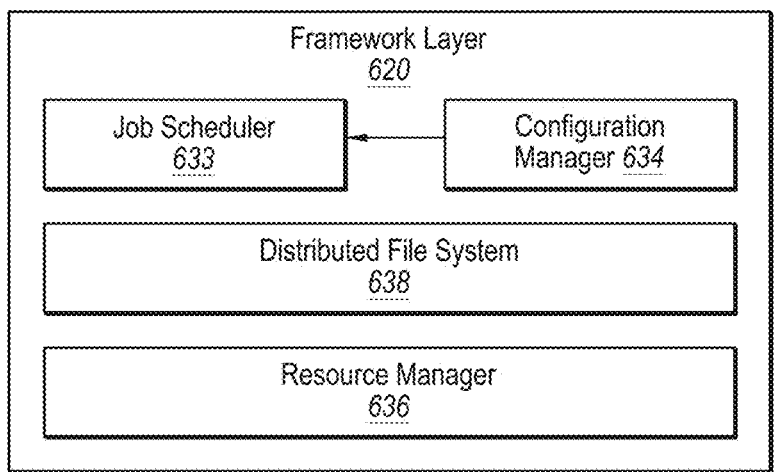
Figure 6:
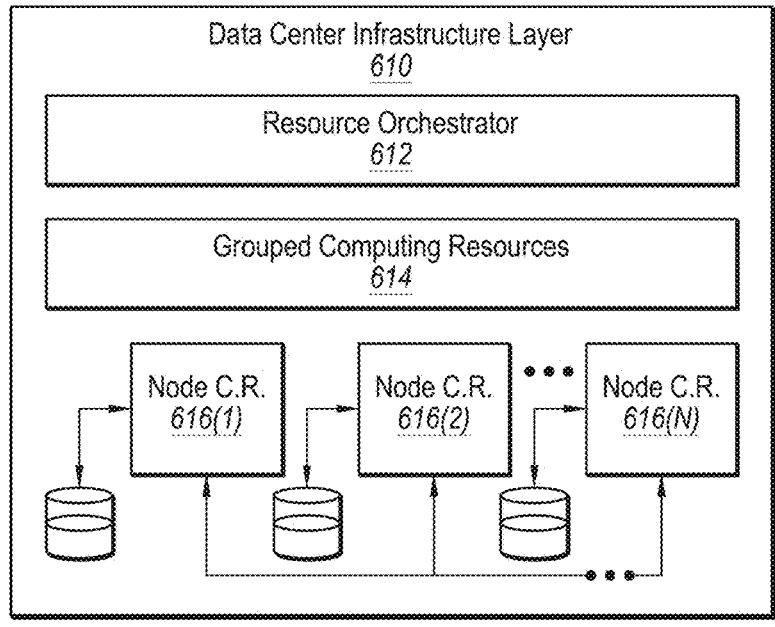

FIG. 6 illustrates an example data center 600 that may be used in at least one embodiments of the present disclosure. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-616(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 632, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 632 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 632. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described in the present disclosure with respect to the data center 600. In at least one embodiment, trained or deployed machine learning models corresponding to one or more neural networks may be used to infer or predict information using resources described in the present disclosure with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described in the present disclosure may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. An autonomous or semi-autonomous machine comprising:
   one or more central processing units (CPUs);
   one or more graphics processing units (GPUs);
   one or more hardware accelerators;
   one or more lighting components;
   one or more external sensors including one or more fields of view or sensory fields external to the autonomous or semi-autonomous machine; and
   one or more internal sensors including one or more fields of view or sensory fields internal to the autonomous or semi-autonomous machine;
   wherein the autonomous or semi-autonomous machine performs operations comprising:
      causing control of the one or more lighting components of the autonomous or semi-autonomous machine based at least on a scene-illumination state of an environment determined using a plurality of illumination states, the plurality of illumination states being determined based at least on sensor data obtained using at least a subset of the one or more external sensors.

2. The autonomous or semi-autonomous machine of claim 1, wherein at least a first external sensor of the one or more external sensors is of a different type than at least a second external sensor of the one or more external sensors.

3. The autonomous or semi-autonomous machine of claim 2, wherein:
   the first external sensor includes a wide-view camera; and
   the second external sensor includes a telescopic camera.

4. The autonomous or semi-autonomous machine of claim 1, wherein the plurality of illumination states include:
   a first illumination state that is based at least on a first level of illumination, as detected using a first external sensor of the one or more external sensors, corresponding to a first position along a first illumination scale; and
   a second illumination state that is based at least on a second level of illumination, as detected using a second external sensor of the one or more external sensors, corresponding to a second position along a second illumination scale.

5. The autonomous or semi-autonomous machine of claim 4, wherein a specific value of the first illumination state is based at least on the first position corresponding to a particular threshold range of a set of threshold ranges along the first illumination scale.

6. The autonomous or semi-autonomous machine of claim 5, wherein the set of threshold ranges includes one or more of:
   a first threshold range corresponding to a first illumination value of "illuminated";
   a second threshold range corresponding to a second illumination value of "dark"; or
   a third threshold range between the first threshold range and the second threshold range corresponding to a third illumination value of "transitory".

7. The autonomous or semi-autonomous machine of claim 5, wherein one or more threshold ranges of the set of threshold ranges varies based at least on a previous scene illumination state determination.

8. The autonomous or semi-autonomous machine of claim 4, wherein a determination as to a specific value of the second illumination state with respect to the second position varies depending on where the first position lies along the first illumination scale.

9. The autonomous or semi-autonomous machine of claim 4, wherein the second illumination state is used as part of determining the scene-illumination state in response to a determined illumination state value of the first illumination state being determined as being "transitory".

10. The autonomous or semi-autonomous machine of claim 1, further comprising one or more systems on a chip (SoCs).

11. The autonomous or semi-autonomous machine of claim 1, wherein the one or more hardware accelerators include at least one of a vision accelerator, a deep learning accelerator (DLA), or a ray-tracing hardware accelerator.

12. A method comprising:

determining a first illumination state corresponding to an area based at least on a first level of illumination corresponding to a first position along a first illumination scale;

determining a second illumination state corresponding to the area based at least on a second level of illumination corresponding to a second position along a second illumination scale;

determining a scene-illumination state of the area based at least on the first illumination state and the second illumination state; and controlling one or more lighting components of a machine based at least on the scene-illumination state.

13. The method of claim 12, wherein a specific value of the first illumination state is based at least on the first position corresponding to a particular threshold range of a set of threshold ranges along the first illumination scale.

14. The method of claim 13, wherein the set of threshold ranges includes one or more of:

a first threshold range corresponding to a first illumination value of "illuminated";

a second threshold range corresponding to a second illumination value of "dark"; or a third threshold range between the first threshold range and the second threshold range corresponding to a third illumination value of "transitory".

15. The method of claim 13, wherein one or more threshold ranges of the set of threshold ranges are based at least on a previous scene illumination state determination.

16. The method of claim 12, wherein a determination as to a specific value of the second illumination state with respect to the second position varies depending on where the first position lies along the first illumination scale.

17. The method of claim 12, wherein:

the first level of illumination is determined based at least on first sensor data obtained using a first illumination sensor; and the second level of illumination is determined based at least on second sensor data obtained using a second illumination sensor.

18. A system of a machine comprising:

one or more central processing units (CPUs);

one or more graphics processing units (GPUs);

one or more hardware accelerators;

one or more lighting components;

external sensors including fields of view or sensory fields external to the machine; and internal sensors including fields of view or sensory fields internal to the machine;

wherein the system causes performance of operations comprising:

causing control of the one or more lighting components of the machine based at least on a combined scene-illumination state of an environment determined based at least on sensor data obtained using two or more external sensors of the external sensors.

19. The system of claim 18, wherein:

at least a first external sensor of the external sensors is of a different type than at least a second external sensor of the external sensors.

20. The system of claim 18, wherein the external sensors include two or more image sensors.

* * * * *